(12) United States Patent
Inomori et al.

(10) Patent No.: US 9,878,757 B2
(45) Date of Patent: Jan. 30, 2018

(54) SADDLE-RIDING VEHICLE

(71) Applicant: YAMAHA HATSUDOKI KABUSHIKI KAISHA, Iwata-shi, Shizuoka (JP)

(72) Inventors: Toshinori Inomori, Shizuoka (JP); Ryuji Inoue, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 492 days.

(21) Appl. No.: 14/551,419

(22) Filed: Nov. 24, 2014

(65) Prior Publication Data
US 2015/0166139 A1   Jun. 18, 2015

(30) Foreign Application Priority Data
Dec. 13, 2013 (JP) ................. 2013-258321

(51) Int. Cl.
*B62K 11/04* (2006.01)
*F02M 35/12* (2006.01)
(Continued)

(52) U.S. Cl.
CPC ............ *B62K 11/04* (2013.01); *B62J 17/00* (2013.01); *B62J 25/00* (2013.01); *B62J 35/00* (2013.01); *F01N 3/10* (2013.01); *B62K 2202/00* (2013.01); *F01N 2340/04* (2013.01); *F01N 2590/04* (2013.01); *F02B 61/02* (2013.01); *F02M 37/007* (2013.01)

(58) Field of Classification Search
CPC ...... F01N 1/085; F01N 1/14; F01N 2260/022; F01N 2230/04; F01N 2450/22; F01N 2470/24; F01N 2590/04; F02M 35/1211; F02M 35/1277; F02M 35/10268; F02B 29/04
See application file for complete search history.

(56) References Cited

U.S. PATENT DOCUMENTS

| 4,577,720 A * | 3/1986 | Hamane ................. F02B 61/02 |
| | | 180/229 |
| 4,632,210 A * | 12/1986 | Yamamoto ............. F01N 13/08 |
| | | 180/219 |
| 2006/0065255 A1* | 3/2006 | Hirayama .............. F01N 3/303 |
| | | 123/585 |

FOREIGN PATENT DOCUMENTS

| EP | 2557290 A1 | 2/2013 |
| FR | 2 964 938 A1 | 3/2012 |

(Continued)

*Primary Examiner* — Joseph M Rocca
*Assistant Examiner* — Daniel S Yeagley
(74) *Attorney, Agent, or Firm* — Keating and Bennett, LLP

(57) ABSTRACT

A fuel tank is disposed under a flat footboard. A vehicle body cover is disposed laterally of the fuel tank. An opening introduces travelling wind to a space between the fuel tank and the vehicle body cover. A first exhaust pipe is located upstream of a catalyst and is connected to an exhaust port. A catalyst housing portion accommodates the catalyst, is connected to the first exhaust pipe, and extends backwardly from the first exhaust pipe. A second exhaust pipe is located downstream of the catalyst, is connected to the catalyst housing portion, extends backwardly from the catalyst housing portion, and is connected to a silencer. The first exhaust pipe at least partially overlaps with the fuel tank in a vehicle front view. The catalyst housing portion is at least partially disposed rearward of the space between the fuel tank and the vehicle body cover.

22 Claims, 23 Drawing Sheets

(51) Int. Cl.
*B62J 25/00* (2006.01)
*B62J 35/00* (2006.01)
*B62J 17/00* (2006.01)
*F01N 3/10* (2006.01)
F02M 37/00 (2006.01)
F02B 61/02 (2006.01)

(56) References Cited

FOREIGN PATENT DOCUMENTS

| | | | | |
|---|---|---|---|---|
| JP | 09088589 A | * | 3/1997 | |
| JP | 10299471 A | * | 11/1998 | ........... F01N 3/2885 |
| JP | 2002211466 A | * | 7/2002 | .............. F02B 61/02 |
| JP | 2002242670 A | * | 8/2002 | |
| JP | 2006083840 A | * | 3/2006 | |
| JP | 2006-104945 A | | 4/2006 | |
| JP | 2006250130 A | * | 9/2006 | |
| JP | 2007-8316 A | | 1/2007 | |
| JP | 2013-36422 A | | 2/2013 | |
| TW | 187088 | | 7/1992 | |
| TW | 523476 B | | 3/2003 | |
| TW | I239909 B | | 9/2005 | |
| TW | I417214 B | | 12/2013 | |
| WO | 2010/013480 A1 | | 2/2010 | |
| WO | WO 2010013481 A1 | * | 2/2010 | .............. B62J 23/00 |

* cited by examiner

SADDLE-RIDING VEHICLE

BACKGROUND OF THE INVENTION

1. Field of the Invention

The present invention relates to a saddle-riding vehicle.

2. Description of the Related Art

Some motorcycles have a structure in which a fuel tank is disposed under a flat footboard due to reasons such as increasing the capacity of a storage box (see, e.g., Japan Laid-open Patent Application Publication No. JP-A-2007-8316).

On the other hand, saddle-riding vehicles have been demanded to dispose a catalyst to process exhaust gas as upstream as possible within an exhaust pipe in order to quickly activate the catalyst. For example, Japan Laid-open Patent Application Publication No. JP-A-2013-36422 discloses a motorcycle including a catalyst disposed upstream of a silencer.

Further, the motorcycles described in JP-A-2007-8316 and JP-A-2013-36422, respectively include an engine unit composed of an engine, an exhaust pipe connected to the engine, and a silencer connected to the exhaust pipe. The engine unit is of a so-called unit swing type and is pivotably supported by a vehicle body frame. The engine unit is disposed under a seat. A flat footboard, on which a rider puts his/her feet, is disposed under and forward of the seat. The flat footboard is disposed forward of the engine unit. A required space is reliably provided when the flat footboard is disposed under and forward of the seat due to the structure that the engine unit is disposed under the seat and is pivotably supported by the vehicle body frame.

The temperature of the catalyst becomes higher than that of the exhaust pipe. Further, in one type of saddle-riding vehicle in which the engine is at least partially disposed under the seat, the farther the catalyst is disposed upstream, the closer the catalyst is to the foot of the rider. Hence, it is required to consider the thermal effect of the catalyst on the foot of the rider.

On the other hand, in another type of saddle-riding vehicle including the flat footboard, the engine is disposed rearward of the flat footboard. Thus, when the fuel tank is disposed under the flat footboard, the farther the catalyst is disposed upstream, the closer the catalyst is to the fuel tank. Hence, it is also required to consider the thermal effect of the catalyst on the fuel tank.

Further, in terms of, for instance, a rider's easiness in getting on and off the vehicle, a footrest portion of the flat footboard is preferably wide in the width direction of the vehicle and is also preferably disposed in a low position. When the fuel tank is disposed under the flat footboard, the fuel tank is required to be wide in the vehicle width direction so as to have a large capacity. Thus, when the catalyst is located upstream, the fuel tank is likely to be affected by the catalyst.

SUMMARY OF THE INVENTION

Preferred embodiments of the present invention quickly activate a catalyst and reduce the thermal effect of the catalyst on the foot of a rider and on a fuel tank disposed under a flat footboard in a saddle-riding vehicle.

A saddle-riding vehicle according to an exemplary preferred embodiment of the present invention includes a vehicle body frame, a seat, a flat footboard, a fuel tank, a vehicle body cover, an opening, and an engine unit. The seat is supported by the vehicle body frame. It should be noted that the seat is directly supported by the vehicle body frame, or alternatively, indirectly supported by the vehicle body frame through another member. The flat footboard is disposed forward of and below the seat. The fuel tank is disposed under the flat footboard. The vehicle body cover is disposed laterally of the fuel tank. The opening introduces travelling wind to a space between the fuel tank and the vehicle body cover. The engine unit is disposed rearward of the flat footboard and the fuel tank, and is pivotably supported by the vehicle body frame. The engine unit is at least partially located under the seat. The engine unit includes an engine, an exhaust pipe, a silencer, and a catalyst. The engine includes an exhaust port. The exhaust pipe is connected to the exhaust port. The silencer is connected to the exhaust pipe. The catalyst is disposed within the exhaust pipe. The exhaust pipe includes a first exhaust pipe, a catalyst housing portion, and a second exhaust pipe. The first exhaust pipe is located upstream of the catalyst and is connected to the exhaust port. The catalyst housing portion accommodates the catalyst, is connected to the first exhaust pipe, and extends backwardly from the first exhaust pipe. The second exhaust pipe is located downstream of the catalyst, is connected to the catalyst housing portion, extends backwardly from the catalyst housing portion, and is connected to the silencer. The first exhaust pipe at least partially overlaps with the fuel tank in a vehicle front view. The catalyst housing portion is at least partially disposed rearward of the space between the fuel tank and the vehicle body cover.

In the saddle-riding vehicle according to a preferred embodiment, the catalyst is disposed as far upstream as possible within the exhaust pipe. Thus, the catalyst is quickly activated by speeding up the increase in the temperature of the catalyst after starting of the engine. Further, after activated, the catalyst is cooled down by travelling wind flowing between the fuel tank and the vehicle body cover during travelling of the vehicle. Therefore, the thermal effect on the foot of a rider is significantly reduced or prevented even when the catalyst is disposed as far upstream as possible within the exhaust pipe and disposed adjacent to a position under the seat. Further, the thermal effect on the fuel tank is significantly reduced or prevented even when the catalyst is disposed close to the fuel tank disposed under the flat footboard.

A cylinder axis of the engine is preferably disposed in a direction intersecting with a vertical direction. Further, a pivot center of the engine unit and the catalyst housing portion are preferably located below the cylinder axis. Yet further, the catalyst housing portion is preferably at least partially disposed rearward of the space between the fuel tank and the vehicle body cover in an entire pivot range of the catalyst housing portion. Due to this structure, the catalyst is always located in a position that frequently receives a travelling wind.

The seat preferably includes a front seat portion on which a rider is seated. Further, the catalyst housing portion preferably overlaps with the front seat portion in a vehicle back-and-forth direction. Further, the catalyst housing portion is preferably at least partially exposed in a vehicle side view. Yet further, the catalyst housing portion preferably overlaps at an inner lateral portion thereof with the fuel tank in the vehicle front view.

Due to this structure, the catalyst housing portion is disposed closer to the center of the vehicle than when it is entirely disposed outward of the fuel tank in the vehicle width direction. Accordingly, the thermal effect on the foot of the rider is significantly reduced or prevented when the rider puts his/her feet on the ground while the vehicle stands still. On the other hand, the catalyst housing portion is at least partially exposed in the vehicle side view. Thus, the outer lateral portion of the catalyst is more effectively cooled down. Incidentally, travelling wind is unlikely to reach the inner lateral portion of the catalyst housing portion that overlaps with the fuel tank. However, the catalyst housing portion is still sufficiently cooled down. Hence, the thermal effect on the fuel tank is significantly reduced or prevented.

The fuel tank preferably includes a slope. The slope tilts upward and laterally outward in the vehicle front view. Further, the slope preferably at least partially overlaps with the catalyst housing portion in the vehicle front view. Due to this structure, the slope guides travelling wind to the catalyst housing portion. Cooling performance of the catalyst is thus enhanced.

The slope preferably at least partially overlaps with the first exhaust pipe in the vehicle front view. Due to this structure, the slope guides travelling wind to the first exhaust pipe. Cooling performance of the catalyst is thus further enhanced.

The engine unit preferably further includes a cooling fan device. Further, the catalyst housing portion is preferably at least partially located forward of a rotational center of the cooling fan device. Due to this structure, the catalyst is cooled down by an air stream produced by the cooling fan device. Cooling performance of the catalyst is thus further enhanced.

The engine unit preferably further includes a cooling fan device. Further, the cooling fan device and the catalyst housing portion are preferably disposed laterally on the same side with respect to a vehicle center line extending in the vehicle back-and-forth direction. Due to this structure, the catalyst is cooled down by the air stream produced by the cooling fan device. Cooling performance of the catalyst is thus further enhanced.

The vehicle body cover preferably extends to a position rearward of the fuel tank. Further preferably, the catalyst housing portion does not at least partially overlap with the vehicle body cover in a vehicle side view. Due to this structure, the catalyst housing portion is at least partially exposed. Cooling performance of the catalyst is thus further enhanced.

The saddle-riding vehicle preferably further includes a link mechanism. The link mechanism connects the engine unit and the vehicle body frame. Further, the catalyst housing portion is preferably at least partially located laterally of the link mechanism. Due to this structure, the catalyst housing portion is disposed as far upstream as possible and the lowest ground height is reliably high in comparison with when it is disposed under the link mechanism.

The saddle-riding vehicle preferably further includes a link mechanism. The link mechanism connects the engine unit and the vehicle body frame. Further, the catalyst housing portion is preferably at least partially located rearward of the link mechanism in a vehicle bottom view. Due to this structure, the catalyst housing portion is disposed as far upstream as possible and the lowest ground height is reliably high in comparison with when it is disposed under the link mechanism.

The saddle-riding vehicle preferably further includes a protection member. The protection member is disposed under the catalyst housing portion. Due to this structure, the protection member protects the catalyst housing portion from obstacles such as stones.

The saddle-riding vehicle preferably further includes a link mechanism. The link mechanism connects the engine unit and the vehicle body frame. Further, the protection member is preferably attached to the link mechanism. Due to this structure, the protection member is easily disposed under the catalyst housing portion.

The protection member is preferably attached to the engine. Due to this structure, the protection member is easily disposed under the catalyst housing portion.

The protection member and the catalyst housing portion preferably produce therebetween a wind guide path, a first opening, and a second opening. The first opening is located forward of the wind guide path and communicates with an external space. The second opening is located rearward of the wind guide path and communicates with the external space. Due to this structure, travelling wind flows into the first opening, flows through the wind guide path, and flows out of the second opening. Thus, the catalyst is cooled down. Cooling performance of the catalyst is thus further enhanced.

The engine preferably includes a rib. The rib extends from the engine to a position below the catalyst housing portion. Due to this structure, the rib protects the catalyst housing portion from obstacles such as stones.

The engine unit preferably further includes a cooling fan device and an engine heat insulation member. The cooling fan device is disposed laterally of the engine. The engine heat insulation member is disposed between the cooling fan device and the catalyst housing portion. Due to this structure, heat from the catalyst is inhibited from being directly transferred to a cooling wind produced by the cooling fan device. Further, a travelling wind is guided by the engine heat insulation member. Cooling performance of the catalyst is thus enhanced.

The engine unit preferably further includes an engine heat insulation member. The engine heat insulation member is disposed between the engine and the catalyst housing portion. Due to this structure, heat from the catalyst is inhibited from being directly transferred to the engine.

The engine heat insulation member and the catalyst housing portion preferably produce therebetween a wind guide path, a first opening, and a second opening. The first opening is located forward of the wind guide path and communicates with an external space. The second opening is located rearward of the wind guide path and communicates with the external space. Due to this structure, the engine heat insulation member inhibits heat from the catalyst from being directly transferred to the engine. Further, a travelling wind flows into the first opening, flows through the wind guide path, and flows out of the second opening. Thus, the catalyst is cooled down. Cooling performance of the catalyst is thus further enhanced.

The saddle-riding vehicle preferably further includes a fuel tank heat insulation member. The fuel tank heat insulation member is disposed between the fuel tank and the catalyst housing portion. Due to this structure, heat from the catalyst is prevented from being directly transferred to the fuel tank.

The saddle-riding vehicle preferably further includes a wind guide member. The wind guide member serves to guide travelling wind flowing under the fuel tank to flow toward the catalyst housing portion, and is disposed between the fuel tank and the catalyst housing portion. Due to this structure, the wind guide member guides travelling wind flowing under the fuel tank to flow toward the catalyst housing portion. Thus, the catalyst is cooled down. Cooling performance of the catalyst is thus further enhanced.

The catalyst housing portion is preferably at least partially located below a bottom surface of the fuel tank while the engine unit is located in the lowest position within a pivot range thereof. Due to this structure, the catalyst housing portion is at least partially located below the bottom surface of the fuel tank. Thus, travelling wind is likely to reach the catalyst housing portion. Cooling performance of the catalyst is thus further enhanced.

The vehicle body frame preferably includes a lower frame. The lower frame runs under the flat footboard and extends rearward. Further, the catalyst housing portion is preferably at least partially located under the lower frame in the vehicle front view. Due to this structure, the lower frame guides travelling wind to flow toward the catalyst housing portion. Cooling performance of the catalyst is thus further enhanced.

In the saddle-riding vehicle according to the various preferred embodiments of the present invention, the catalyst is disposed as far upstream as possible within the exhaust pipe, and thus, the catalyst is quickly activated by speeding up the increase in the temperature of the catalyst after starting of the engine. Further, after activated, the catalyst is cooled down by travelling wind flowing between the fuel tank and the vehicle body cover during travelling of the vehicle. Therefore, the thermal effect on the foot of the rider is significantly reduced or prevented even when the catalyst is disposed as far upstream as possible within the exhaust pipe and disposed adjacent to a position under the seat. Further, the thermal effect on the fuel tank is significantly reduced or prevented even when the catalyst is disposed as far upstream as possible within the exhaust pipe and close to the fuel tank disposed under the flat footboard.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
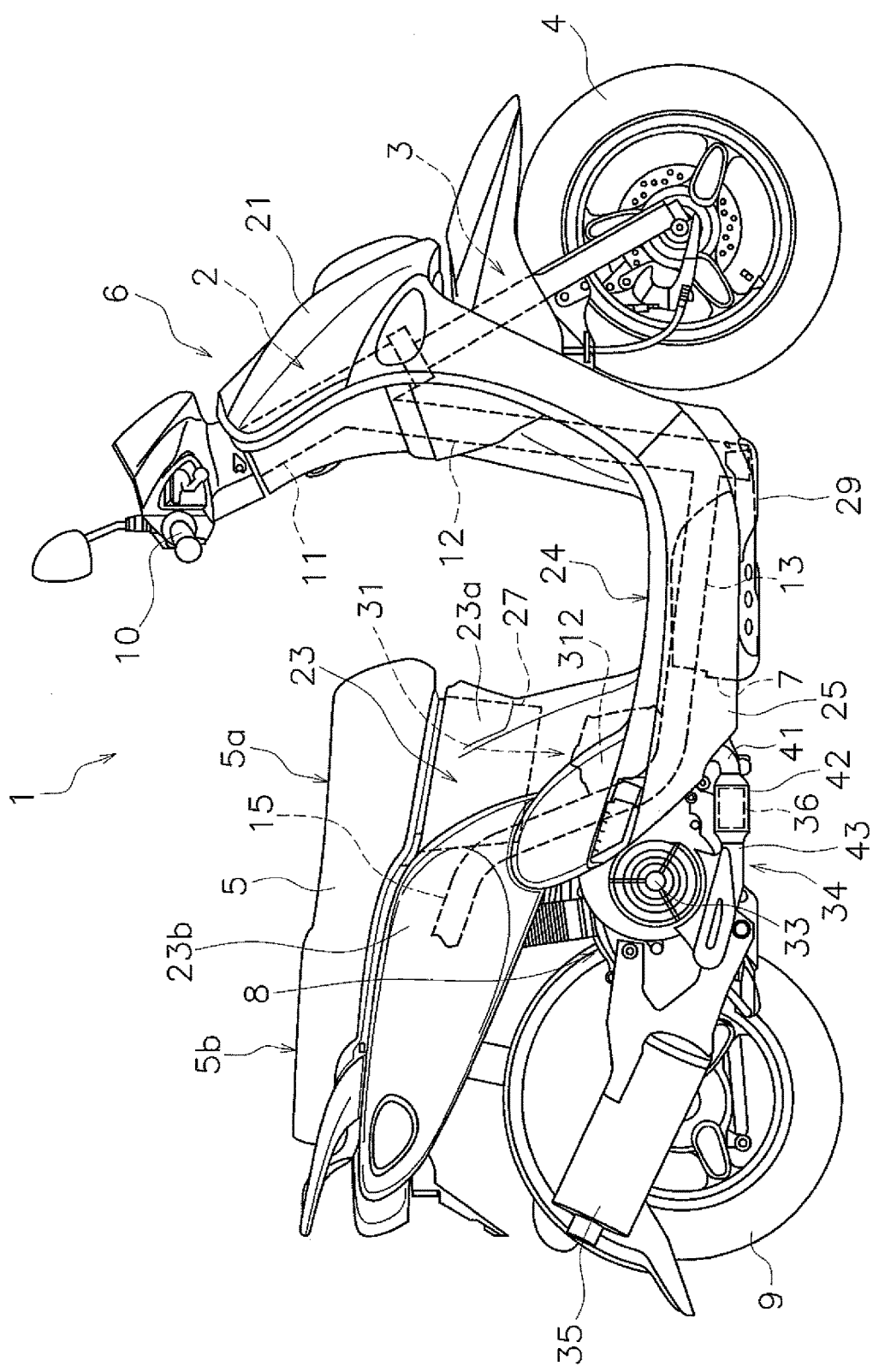
FIG. 1 is a right side view of a saddle-riding vehicle according to a preferred embodiment of the present invention.

Saddle-riding vehicles according to exemplary preferred embodiments will be hereinafter explained with reference to the attached drawings. FIG. 1 is a right side view of a saddle-riding vehicle 1 according to the exemplary preferred embodiments. The saddle-riding vehicle 1 is preferably a scooter-type motorcycle, for example. The saddle-riding vehicle 1 includes a vehicle body frame 2, a front fork 3, a front wheel 4, a seat 5, a vehicle body cover 6, a fuel tank 7, an engine unit 8, and a rear wheel 9. It should be noted that in the exemplary preferred embodiments, directional terms "front", "rear", "right" and "left" and their related terms refer to those as seen from a rider seated on the seat 5.

The vehicle body frame 2 includes a head pipe 11 and a down frame 12. The front fork 3 is turnably supported by the head pipe 11. A handle 10 is attached to the upper portion of the front fork 3. The front wheel 4 is rotatably supported by the lower portion of the front fork 3. The down frame 12 extends downwardly from the head pipe 11.

Figure 2:
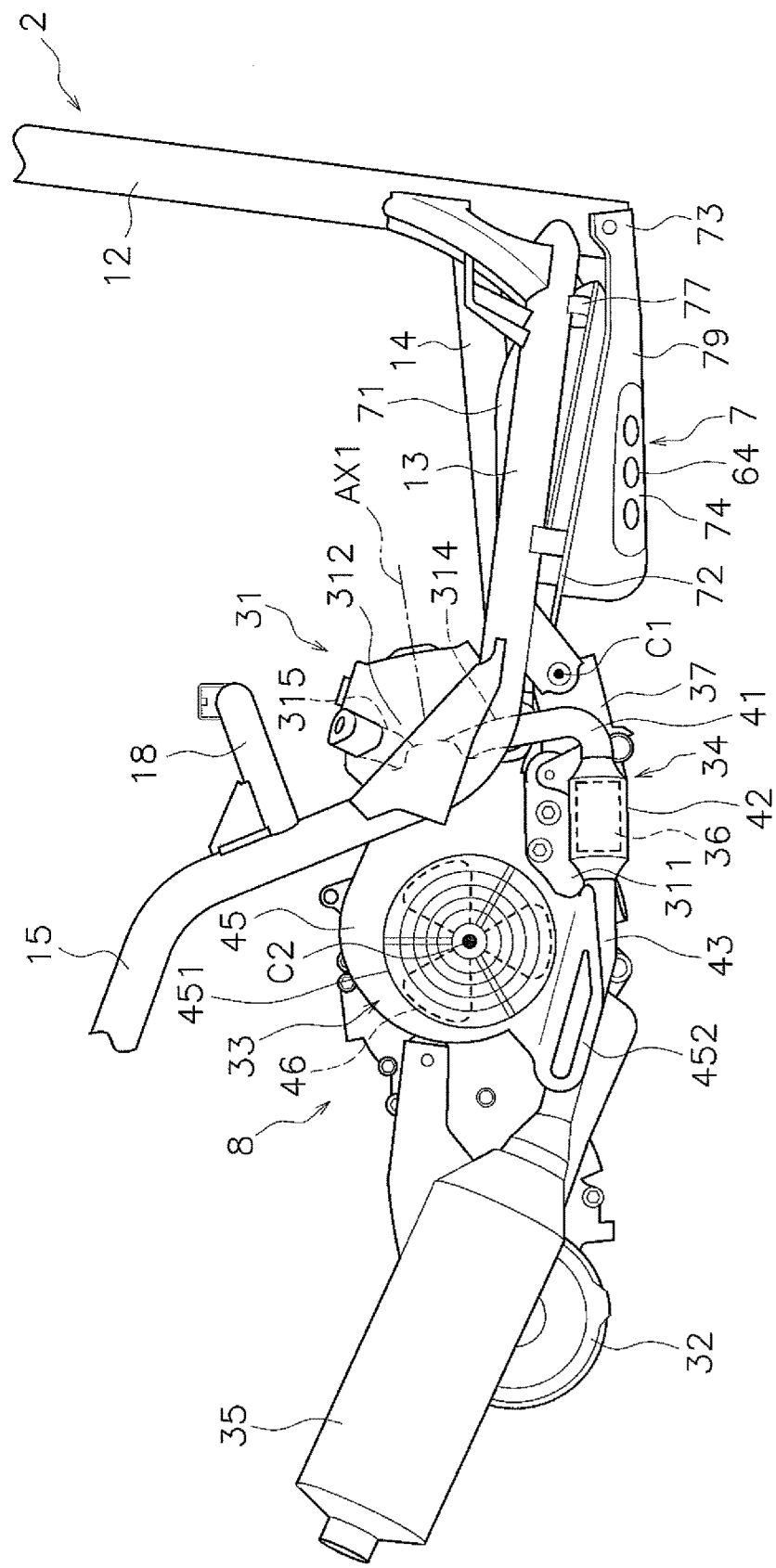
FIG. 2 is a right side view of a vehicle body frame and an engine unit of the saddle-riding vehicle.
Figure 3:
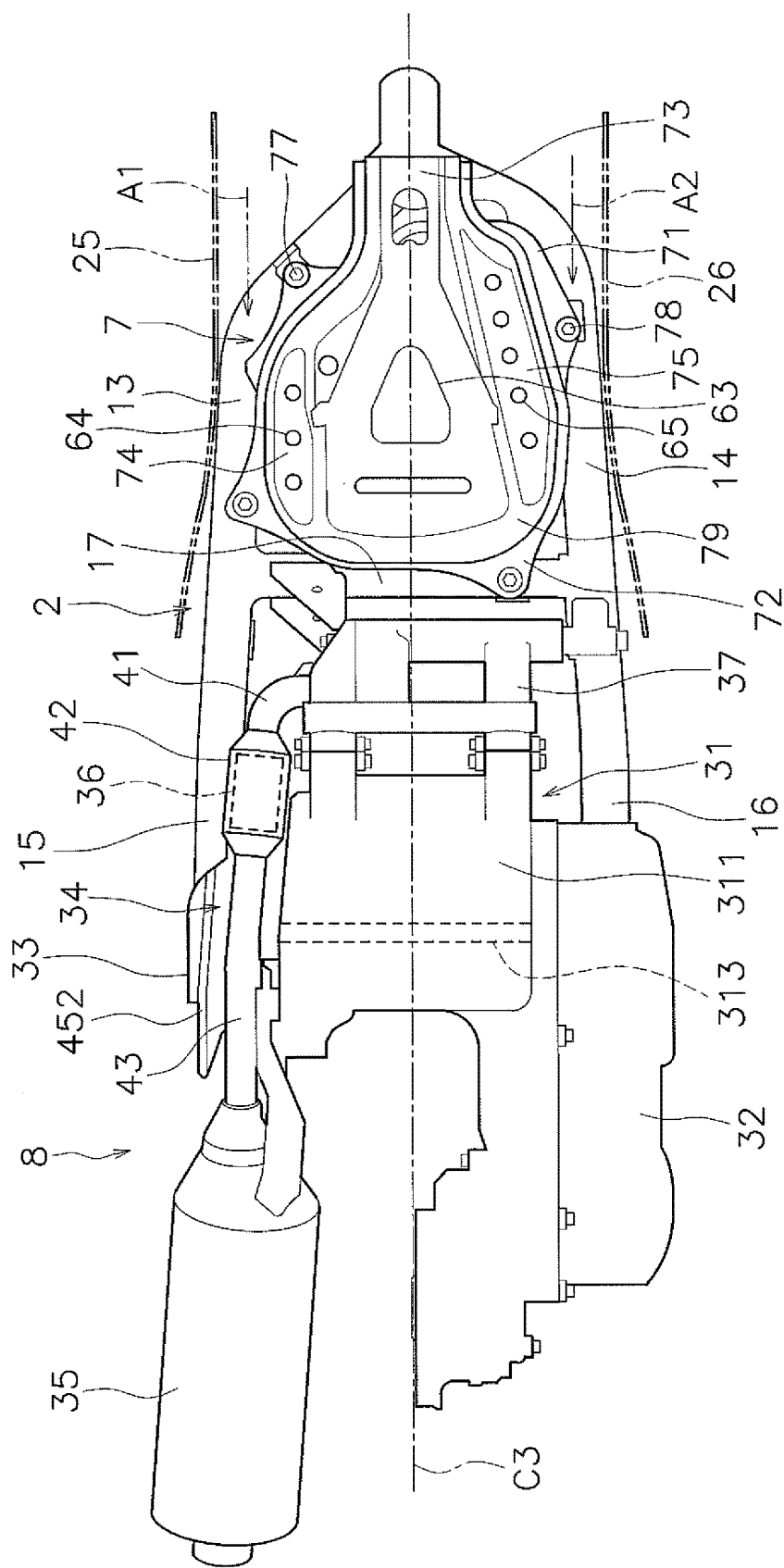
FIG. 3 is a bottom view of the vehicle body frame and the engine unit.
Figure 4:
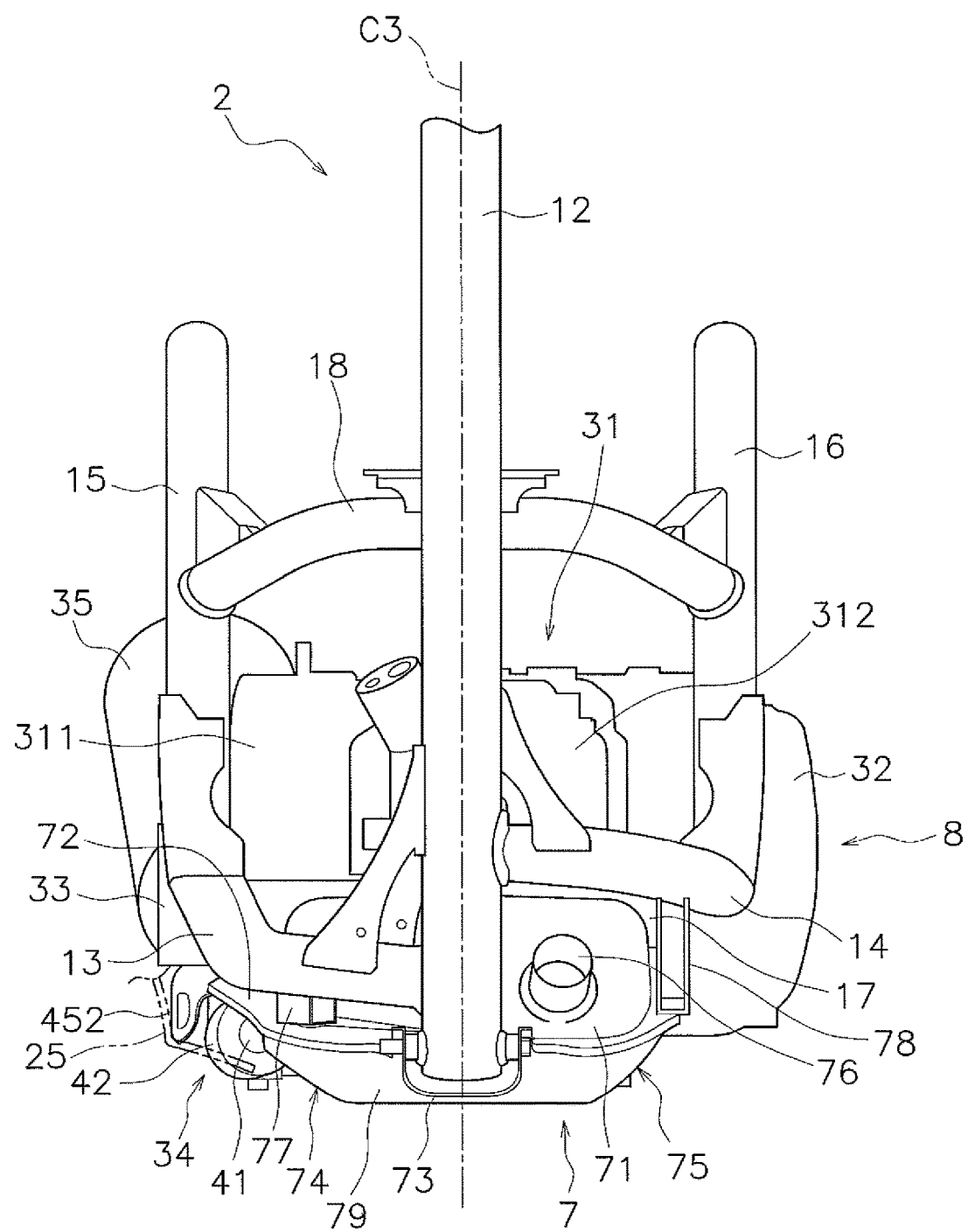
FIG. 4 is a front view of the vehicle body frame and the engine unit.

FIG. 2 is a right side view of the vehicle body frame 2 and the engine unit 8. FIG. 3 is a bottom view of the vehicle body frame 2 and the engine unit 8. FIG. 4 is a front view of the vehicle body frame 2 and the engine unit 8. As shown in FIGS. 1 to 4, the vehicle body frame 2 includes a first lower frame 13, a second lower frame 14, a first rear frame 15, and a second rear frame 16.

The first lower frame 13 and the second lower frame 14 are connected to the lower portion of the down frame 12, and extend backwardly therefrom. In detail, the first lower frame 13 obliquely tilts upward to the rear. The second lower frame 14 obliquely tilts downward to the rear. The first lower frame 13 and the second lower frame 14 are disposed apart from each other in the width direction of the vehicle. In the present exemplary preferred embodiment, the first lower frame 13 is the right side one of the lower frames, whereas the second lower frame 14 is the left side one of the lower frames. A connection portion between the first lower frame 13 and the down frame 12 is located below the connection portion between the second lower frame 14 and the down frame 12.

The first rear frame 15 is connected to the rear portion of the first lower frame 13, and extends therefrom obliquely upward to the rear. The second rear frame 16 is connected to the rear portion of the second lower frame 14, and extends therefrom obliquely upward to the rear. In the present exemplary preferred embodiment, the first rear frame 15 is the right side one of the rear frames, whereas the second rear frame 16 is the left side one of the rear frames.

It should be noted that a portion or all of the head pipe 11, the down frame 12, the lower frames 13 and 14, and the rear frames 15 and 16 may be defined by a unitary integrated member. Alternatively, a portion or all of the head pipe 11, the down frame 12, the lower frames 13 and 14, and the rear frames 15 and 16 may be discrete members joined to each other by a fixing method such as welding.

As shown in FIG. 3, the vehicle body frame 2 includes a first coupling frame 17. The first coupling frame 17 extends in the vehicle width direction. The first coupling frame 17 is bridged between the first lower frame 13 and the second lower frame 14. Thus, the first coupling frame 17 couples the first lower frame 13 and the second lower frame 14. As shown in FIGS. 2 and 4, the vehicle body frame 2 includes a second coupling frame 18. The second coupling frame 18 is bridged between the first rear frame 15 and the second rear frame 16. Thus, the second coupling frame 18 couples the first rear frame 15 and the second rear frame 16.

As shown in FIG. 1, the seat 5 is supported by the vehicle body frame 2. In detail, a housing portion 27 is supported by the vehicle body frame 2, and in turn, supports the seat 5. The seat 5 is disposed over the first rear frame 15 and the second rear frame 16. The seat 5 includes a front seat portion 5a and a rear seat portion 5b. The front seat portion 5a is a portion on which the rider is seated. The rear seat portion 5b is located rearward of the front seat portion 5a. The top surface of the rear seat portion 5b is located above the front seat portion 5a. It should be noted that the front seat portion 5a and the rear seat portion 5b are not necessarily required to be clearly separated from each other. The top surface of the rear seat portion 5b may continue to the front seat portion 5a so as to define a stepless flat surface. Due to this structure, the front seat portion is the front half of the entire longitudinal length of the seat 5. When the seat 5 alternatively includes a step, the front seat portion is the portion located forward of the step.

The vehicle body cover 6 is supported by the vehicle body frame 2. The vehicle body cover 6 includes a front cover 21, a lower cover 22, and a rear cover 23. The front cover 21 covers the head pipe 11 and the down frame 12. The lower cover 22 covers the first lower frame 13 and the second lower frame 14.

In detail, the lower cover 22 includes a flat footboard 24. The flat footboard 24 is the top surface of the lower cover 22. The flat footboard 24 is disposed below and forward of the seat 5. The flat footboard 24 is disposed over the first lower frame 13 and the second lower frame 14. The first lower frame 13 and the second lower frame 14 run under the flat footboard 24 and extend backward. The flat footboard 24 preferably has a flat shape.

It should be noted that the expression "the flat footboard 24 preferably has a flat shape" means that the flat footboard 24 is flat or substantially flat over the vehicle width direction and does not include a convex portion, by which a space is disposed therein to accommodate a portion of the vehicle body frame 2, in the middle thereof in the vehicle width direction. Alternatively, the expression "the flat footboard 24 preferably has a flat shape" means that the flat footboard 24 is flat or substantially flat enough to enable the rider to put his/her feet on any portion of the flat footboard 24. Thus, the flat footboard 24 may include, for instance, convexo-concave portions for an anti-slippage purpose or so forth.

Figure 5:
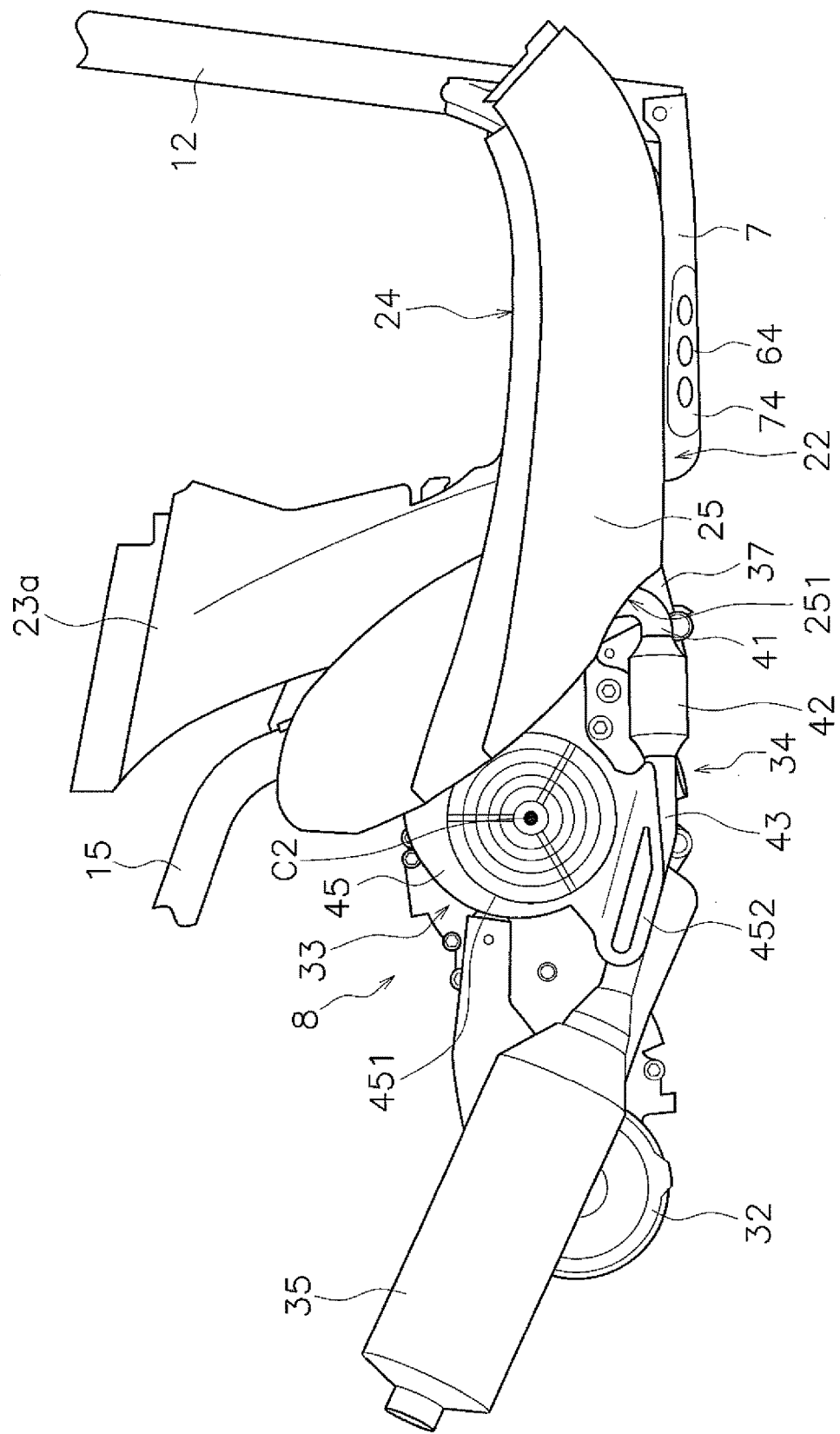
FIG. 5 is a partial right side view of the saddle-riding vehicle.
Figure 6:
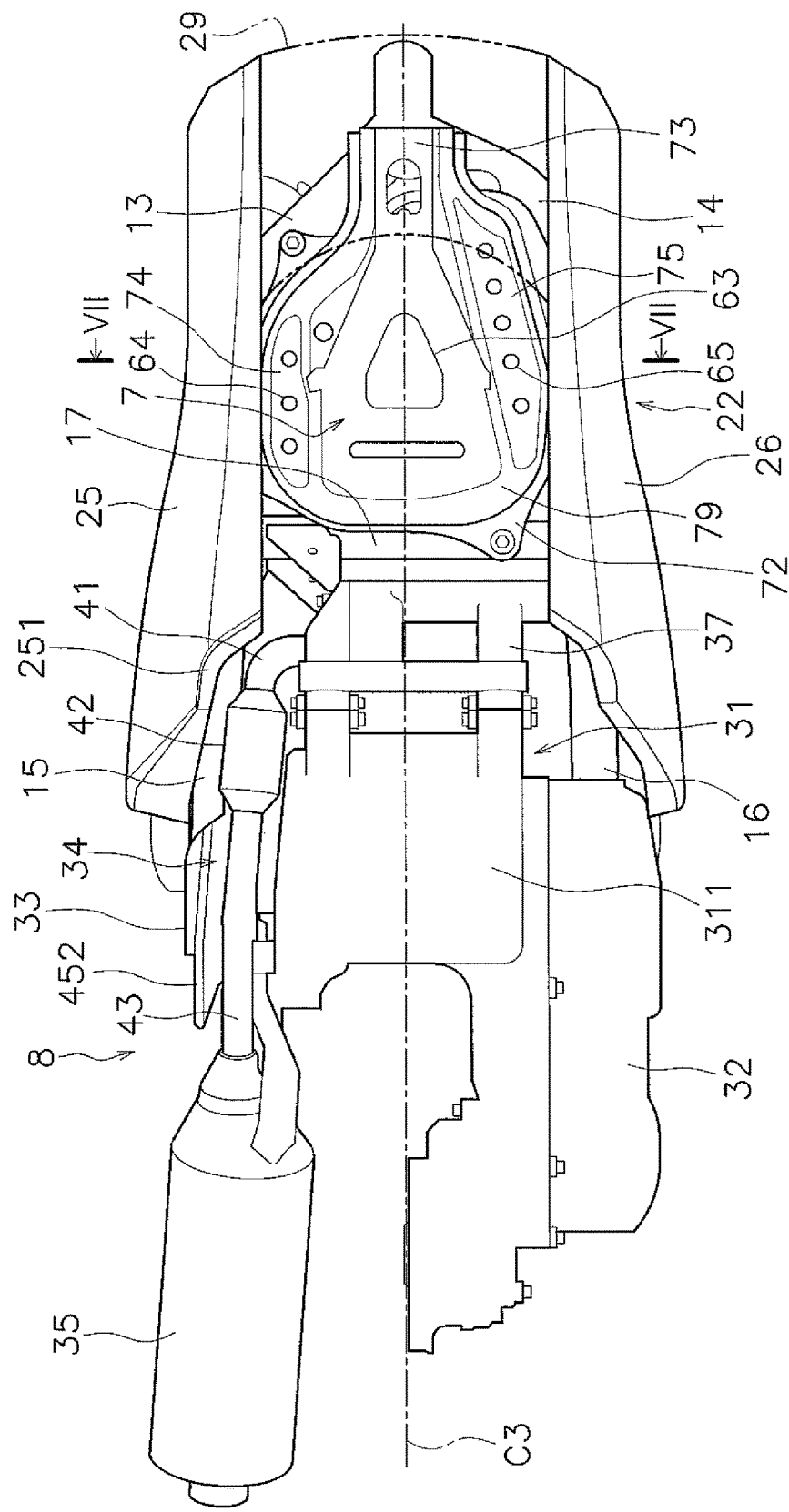
FIG. 6 is a partial bottom view of the saddle-riding vehicle.

FIG. 5 is a partial right side view of the saddle-riding vehicle 1. FIG. 6 is a partial bottom view of the saddle-riding vehicle 1. As shown in FIGS. 5 and 6, the lower cover 22 includes a first side lower cover 25, a second side lower cover 26, and a center lower cover 29. The first side lower cover 25 is disposed laterally on one side of the fuel tank 7, whereas the second side lower cover 26 is disposed laterally on the other side of the fuel tank 7. In the present exemplary preferred embodiment, the first side lower cover 25 is disposed on the right side of the fuel tank 7, whereas the second side lower cover 26 is disposed on the left side of the fuel tank 7. The center lower cover 29 is disposed between the first side lower cover 25 and the second side lower cover 26. It should be noted that in FIG. 6, only the outer contour of the center lower cover 29 is depicted with dashed two-dotted lines for easy understanding.

The first side lower cover 25 laterally covers the first lower frame 13. The first side lower cover 25 is disposed on the right side of the first lower frame 13. The first side lower cover 25 extends to a position rearward of the fuel tank 7. It should be noted that the first side lower cover 25 is only required to be partially located laterally of the fuel tank 7. The second side lower cover 26 laterally covers the second lower frame 14. The second side lower cover 26 is disposed on the left side of the second lower frame 14.

As shown in FIG. 1, the rear cover 23 is disposed under the seat 5 and covers the space under the seat 5. A front portion 23a of the rear cover 23 extends upwardly from the rear end of the flat footboard 24. A lateral portion 23b of the rear cover 23 laterally covers the space under the seat 5. It should be noted that the housing portion 27 is disposed under the seat 5. The housing portion 27 is located over the engine unit 8.

The fuel tank 7 is disposed under the flat footboard 24. As shown in FIGS. 2 to 4, the fuel tank 7 includes a tank body 71 and a tank cover 79. The tank body 71 includes an internal space to store fuel. The tank body 71 is disposed between the first lower frame 13 and the second lower frame 14. The tank body 71 is disposed forward of the first coupling frame 17. In a side view of the vehicle, the tank body 71 overlaps with the first lower frame 13. The tank body 71 includes a first tank attachment portion 77 and a second tank attachment portion 78. The tank body 71 is attached at the first tank attachment portion 77 to the first lower frame 13. The tank body 71 is attached at the second tank attachment portion 78 to the second lower frame 14.

The tank cover 79 is disposed under the tank body 71. The tank cover 79 includes a first cover attachment portion 72 and a second cover attachment portion 73. The first cover attachment portion 72 preferably has a flange shape. The first cover attachment portion 72 is attached to the first lower frame 13, the second lower frame 14, and the first coupling frame 17. The tip of the second cover attachment portion 73 is attached to the lower end of the down frame 12.

The center lower cover 29 is not disposed under the tank cover 79. Specifically, the center lower cover 29 is disposed forward of the tank cover 79. The bottom surface of the tank cover 79 is located below the center lower cover 29. In other words, the bottom surface of the fuel tank 7 is located below the center lower cover 29.

The tank cover 79 includes a first slope 74 and a second slope 75. The first slope 74 and the second slope 75 tilt upward and laterally outward in a vehicle front view. In detail, the first slope 74 is the right lateral portion of the bottom surface of the tank cover 79. The first slope 74 tilts upward to the right. The second slope 75 is the left lateral portion of the bottom surface of the tank cover 79. The second slope 75 tilts upward to the left. The first slope 74 and the second slope 75 are located below the first cover attachment portion 72. The first slope 74 is located below the first lower frame 13. The second slope 75 is located below the second lower frame 14.

As shown in FIG. 4, a fuel port 76 is connected to the tank body 71. The fuel port 76 is a port to which a fuel pipe is fitted to supply fuel to the tank body 71. The fuel port 76 protrudes from the tank body 71. In a vehicle front view, the fuel port 76 is located under the second lower frame 14. In the vehicle front view, the fuel port 76 is located at the same or approximately the same height as the connection portion between the first lower frame 13 and the down frame 12.

Figure 7:
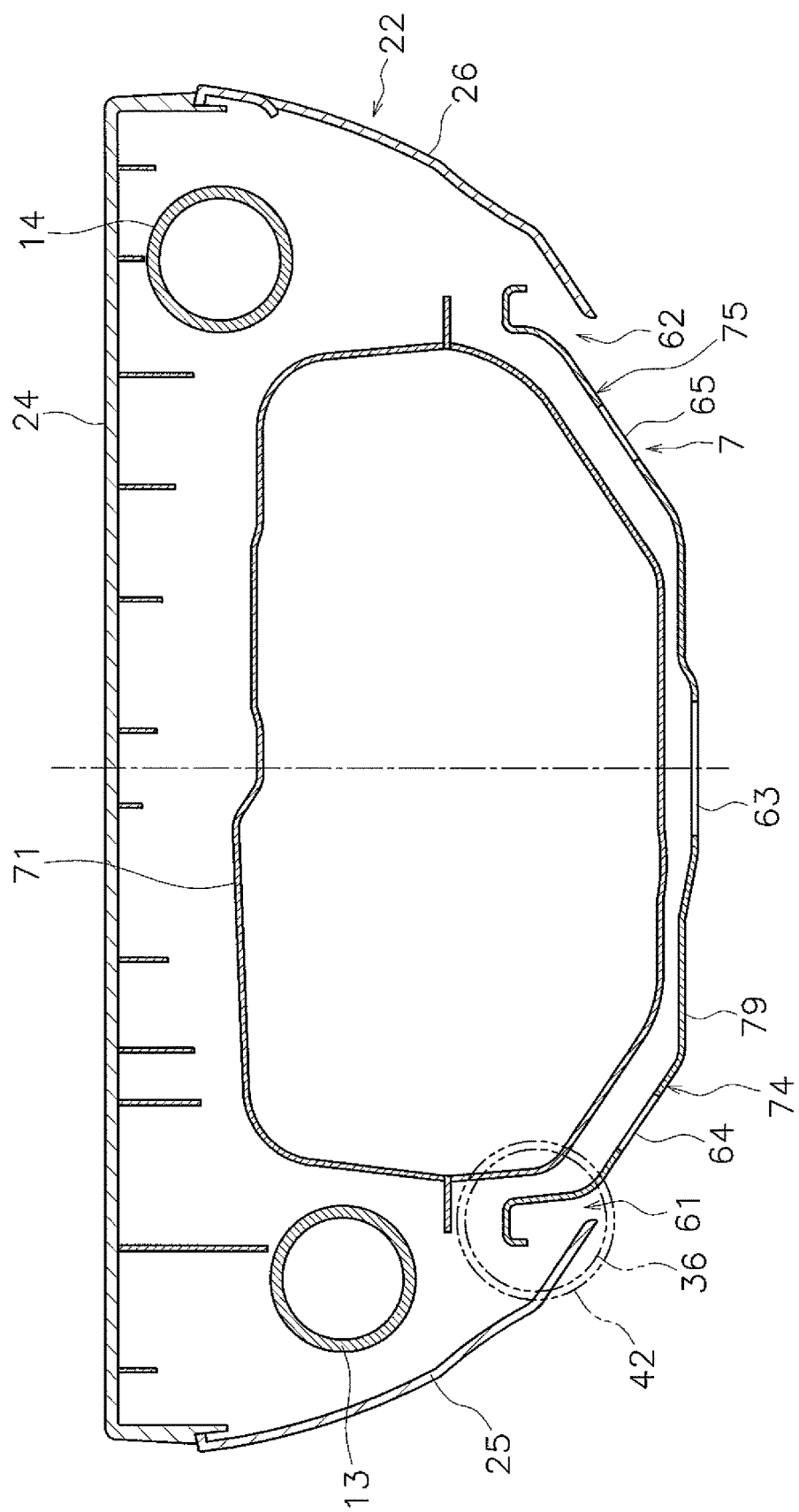
FIG. 7 is a cross-sectional view of FIG. 6 taken along a line VII-VII.

As shown in FIG. 6, the lower cover 22 is not disposed under at least a portion of the fuel tank 7. Thus, clearances are provided between the fuel tank 7 and the lower cover 22. FIG. 7 is a cross-sectional view of FIG. 6 taken along a line VII-VII. As shown in FIG. 7, a clearance 61 (hereinafter referred to as "a first opening 61") is provided between the fuel tank 7 and the first side lower cover 25. On the other hand, a clearance 62 (hereinafter referred to as "a second opening 62") is provided between the fuel tank 7 and the second side lower cover 26. The first opening 61 and the second opening 62 introduce travelling wind to the space between the fuel tank 7 and the vehicle body cover 6.

Further, the tank cover 79 includes a third opening 63. The third opening 63 is provided, e.g., bored, in the middle portion of the tank cover 79 in the vehicle width direction. Further, the tank cover 79 includes at least one fourth opening 64 and at least one fifth opening 65. The fourth opening 64 is provided in the first slope 74. The fifth opening 65 is provided in the second slope 75. The third to fifth openings 63 to 65 introduce travelling wind to the space between the tank body 71 and the tank cover 79. Travelling wind is introduced to the space between the fuel tank 7 and the vehicle body cover 6 through the space between the tank body 71 and the tank cover 79.

As described above, travelling wind is introduced through the first to fifth openings 61 to 65, and is accordingly introduced to the space between the fuel tank 7 and the first side lower cover 25 as shown in FIG. 3 (see the dashed dotted arrow A1 in FIG. 3). Likewise, travelling wind is introduced to the space between the fuel tank 7 and the second side lower cover 26 (see the dashed dotted arrow A2 in FIG. 3).

As shown in FIG. 1, the engine unit 8 is disposed rearward of the flat footboard 24 and the fuel tank 7. The engine unit 8 is preferably of a so-called unit-swing type, and is pivotably supported by the vehicle body frame 2. The engine unit 8 is located under the seat 5. The engine unit 8 supports the rear wheel 9 in a rotatable state. The engine unit 8 includes an engine 31, a transmission 32, a cooling fan device 33, an exhaust pipe 34, a silencer 35, and a catalyst 36.

Figure 8:
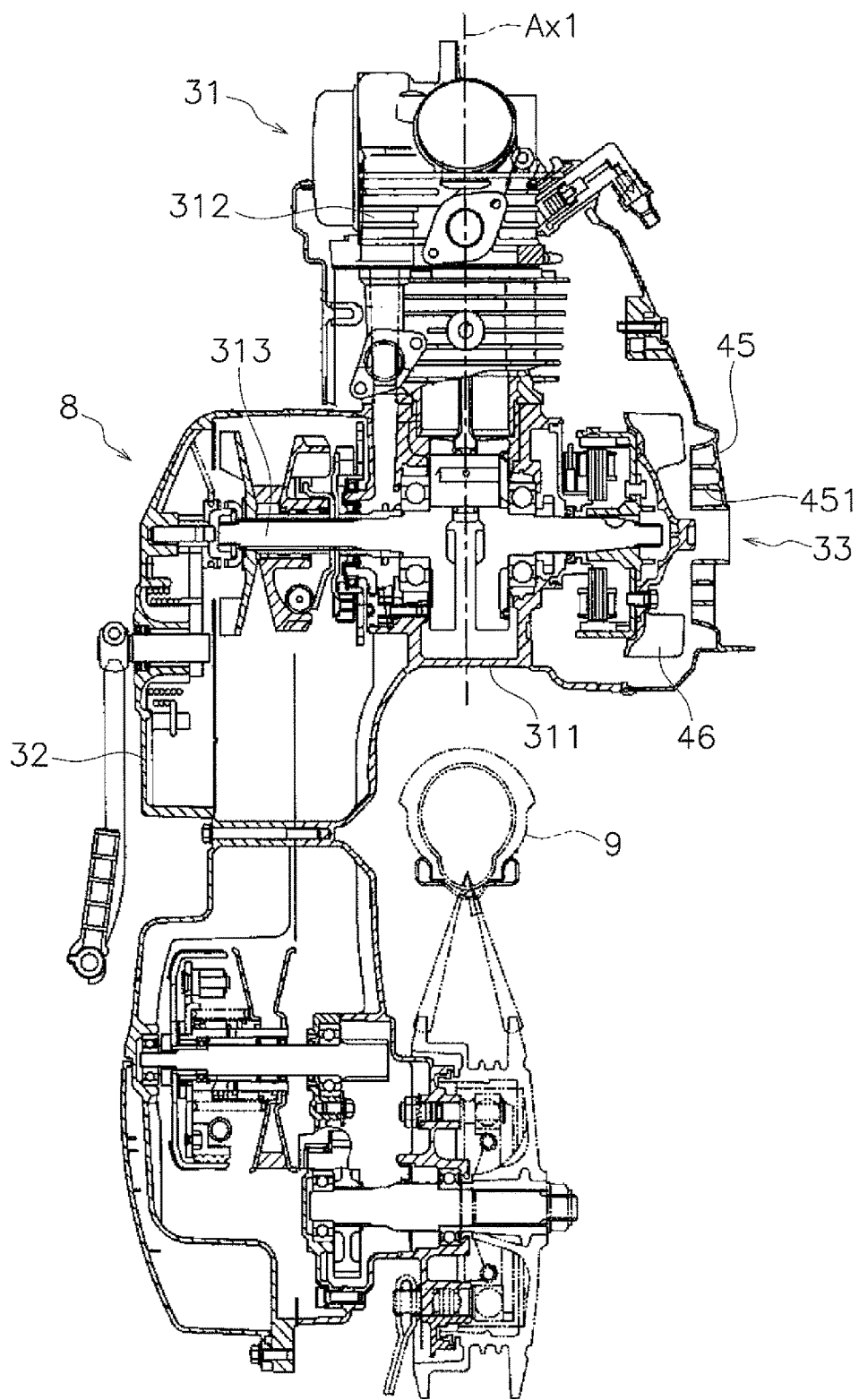
FIG. 8 is a cross-sectional view of the engine unit.

The engine 31 is preferably an air-cooled engine. The engine 31 is disposed under the seat 5. FIG. 8 is a cross-sectional view of the engine unit 8. The engine 31 includes a crankcase 311 and a cylinder 312. The crankcase 311 accommodates a crankshaft 313. The rotational axis of the crankshaft 313 extends in the vehicle width direction. As shown in FIG. 2, the cylinder 312 is disposed forward of the crankcase 311. The cylinder 312 is disposed between the first rear frame 15 and the second rear frame 16, and partially protrudes forward of the first rear frame 15 and the second rear frame 16. A cylinder axis Ax1, which is the center axis of the cylinder 312, is disposed in a direction intersecting with the vertical direction. In detail, the cylinder axis Ax1 of the cylinder 312 obliquely tilts upward to the front.

As shown in FIG. 2, the engine unit 8 is connected to the vehicle body frame 2 through a link mechanism 37. The engine unit 8 is disposed so as to be pivotable about a pivot center C1 located in a connection portion between the link mechanism 37 and the vehicle body frame 2. The pivot center C1 is located below the cylinder axis Ax1.

The transmission 32 is disposed laterally on one side of the crankcase 311, whereas the cooling fan device 33 is disposed laterally on the other side of the crankcase 311. In the present exemplary preferred embodiment, the transmission 32 is disposed on the left side of the crankcase 311, whereas the cooling fan device 33 is disposed on the right side of the crankcase 311. The transmission 32 extends rearward from the position located laterally to the crankcase 311, and supports the rear wheel 9.

The cooling fan device 33 is configured to produce an air stream to cool the engine 31. The cooling fan device 33 cools the engine 31 by producing the air stream flowing in the surrounding of the engine 31. The cooling fan device 33 is disposed rearward of the first side lower cover 25. The cooling fan device 33 is disposed rearward of the first rear frame 15. The cooling fan device 33 includes a fan cover 45 and a cooling fan 46.

The fan cover 45 laterally covers the cooling fan 46. The cooling fan 46 is disposed so as to be rotatable about a rotational center C2. The fan cover 45 includes a grill portion 451 and an exhaust pipe cover portion 452. The grill portion 451 is disposed in a position opposed to the cooling fan 46. The exhaust pipe cover portion 452 laterally covers a portion of the exhaust pipe 34.

As shown in FIG. 2, the cylinder 312 includes an exhaust port 314 and an intake port 315. The exhaust port 314 is located below the intake port 315. The exhaust pipe 34 is connected to the exhaust port 314. The silencer 35 is connected to the exhaust pipe 34. The silencer 35 is disposed rearward of the cylinder 312. The silencer 35 is disposed laterally of the rear wheel 9, and overlaps with the rear wheel 9 in the vehicle side view. In the present exemplary preferred embodiment, the silencer 35 is disposed on the right side of the rear wheel 9. The catalyst 36 is disposed within the exhaust pipe 34.

The exhaust pipe 34 includes a first exhaust pipe 41, a catalyst housing portion 42, and a second exhaust pipe 43. The first exhaust pipe 41 is a portion located upstream of the catalyst 36 in the flow of exhaust gas within the exhaust pipe 34, and is connected to the exhaust port 314. The exhaust port 314 is disposed on the lateral surface of the cylinder 312. The first exhaust pipe 41 protrudes downwardly from the exhaust port 314 and bends rearward. The first exhaust pipe 41 is disposed so as to extend laterally to the link mechanism 37.

The catalyst housing portion 42 accommodates the catalyst 36. The outer diameter of the catalyst housing portion 42 is greater than that of the first exhaust pipe 41. Further, the outer diameter of the catalyst housing portion 42 is greater than that of the second exhaust pipe 43. The catalyst housing portion 42 is connected to the first exhaust pipe 41 and extends rearward. The catalyst housing portion 42 is located below the cylinder axis Ax1. As shown in FIGS. 4 and 7, the catalyst housing portion 42 is partially disposed rearward of the space produced between the fuel tank 7 and the first side lower cover 25. It should be noted that in FIG. 4, a dashed two-dotted line depicts a portion of the rear edge of the first side lower cover 25. In FIG. 7, dashed two-dotted lines depict the outer contour of the catalyst housing portion 42 and that of the catalyst 36, both of which are cross-sectioned along the front end portion of the catalyst 36.

The second exhaust pipe 43 is a portion located downstream of the catalyst 36. The second exhaust pipe 43 is connected to the catalyst housing portion 42 and extends backwardly from the rear end of the catalyst housing portion 42. The second exhaust pipe 43 is disposed between the catalyst housing portion 42 and the silencer 35 and is connected to the silencer 35.

As shown in FIG. 5, the catalyst housing portion 42 does not overlap with the first side lower cover 25 in the vehicle side view. Thus, the catalyst housing portion 42 is entirely exposed to the outside in the vehicle side view. The first side cover 25 includes a recess 251 produced by forwardly recessing the rear portion thereof. The catalyst housing portion 42 is disposed rearward of the recess 251 in the vehicle side view.

The catalyst housing portion 42 is partially located laterally of the link mechanism 37. Thus, the catalyst housing portion 42 partially overlaps with the link mechanism 37 in the vehicle side view.

The catalyst housing portion 42 overlaps with the front seat portion 5a in the back-and-forth direction of the vehicle. In other words, the catalyst housing portion 42 is located under the front seat portion 5a in the vehicle side view. The catalyst housing portion 42 is located rearward of the front end of the front seat portion 5a. The catalyst housing portion 42 is located forward of the rear end of the front seat portion 5a. The catalyst housing portion 42 is located laterally of the engine 31. In detail, the catalyst housing portion 42 is located laterally of the crankcase 311. The catalyst housing portion 42 is located forward of the rotational center C2 of the cooling fan device 33. The catalyst housing portion 42 is located below the rotational center C2 of the cooling fan device 33.

The cooling fan device 33 and the catalyst housing portion 42 are disposed laterally on the same side with respect to a vehicle center line C3 extending in the back-and-forth direction of the vehicle. In the present exemplary preferred embodiment, the cooling fan device 33 and the catalyst housing portion 42 are disposed on the right side of the vehicle center line C3 extending in the vehicle back-and-forth direction. The catalyst housing portion 42 is partially disposed under the cooling fan device 33. The second exhaust pipe 43 is disposed so as to run under the cooling fan device 33. The catalyst housing portion 42 partially overlaps with the first rear frame 15 in the vehicle bottom view. The catalyst housing portion 42 is partially located inward of the first rear frame 15 in the vehicle width direction. The catalyst housing portion 42 is also partially located inward of the first lower frame 13 in the vehicle width direction.

It should be noted that in the present exemplary preferred embodiment, the expression "inward in the vehicle width direction" means a direction toward the vehicle center line C3 that passes through the vehicle center in the vehicle width direction and extends in the vehicle back-and-forth direction. Contrarily, the expression "outward in the vehicle width direction" means a direction opposite to the direction indicated by the expression "inward in the vehicle width direction". In other words, the expression "outward in the vehicle width direction" means a direction away from the vehicle center line C3 that passes through the vehicle center in the vehicle width direction and extends in the vehicle back-and-forth direction.

As shown in FIG. 4, the first exhaust pipe 41 partially overlaps with the fuel tank 7 in the vehicle front view. The first slope 74 partially overlaps with the catalyst housing portion 42 in the vehicle front view. The inner lateral portion of the catalyst housing portion 42 overlaps with the fuel tank 7 in the vehicle front view. The catalyst housing portion 42 is located under the first lower frame 13 in the vehicle front view.

It should be noted that the above described positional arrangement of the elements (e.g., the catalyst housing portion 42) in the engine unit 8 is only required to be established at least partially within the pivot range of the engine unit 8. For example, the above described positional arrangement of the elements (e.g., the catalyst housing portion 42) in the engine unit 8 indicates the one in which a condition that the saddle-riding vehicle 1 stands still upright without a rider riding thereon while the front wheel 4 and the rear wheel 9 make contact with the horizontal ground.

Figure 9:
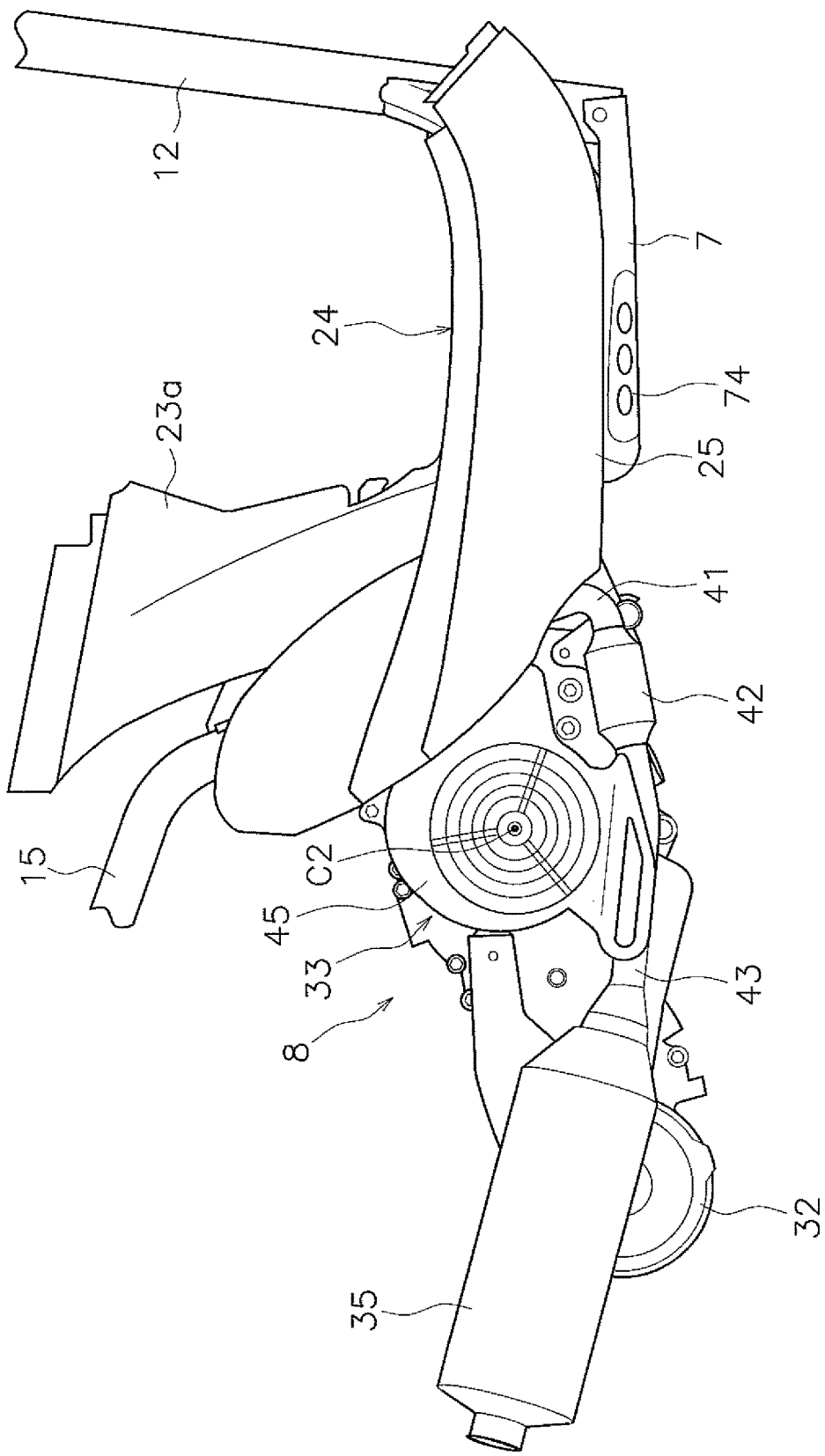
FIG. 9 is a diagram showing a condition in which the engine unit is located in the lowest position within the pivot range thereof.
Figure 10:
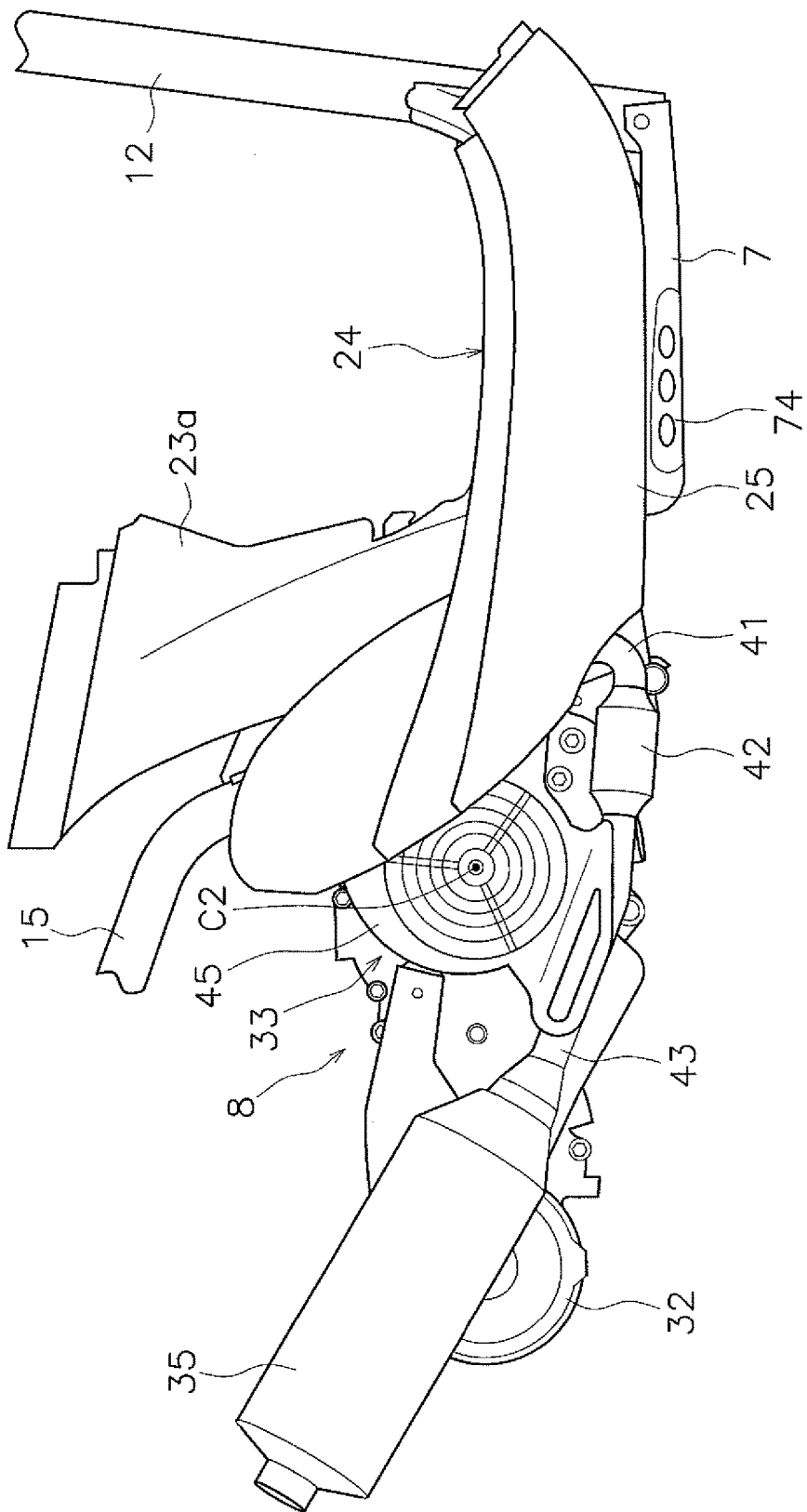
FIG. 10 is a diagram showing a condition in which the engine unit is located in the highest position within the pivot range thereof.
Figure 11:
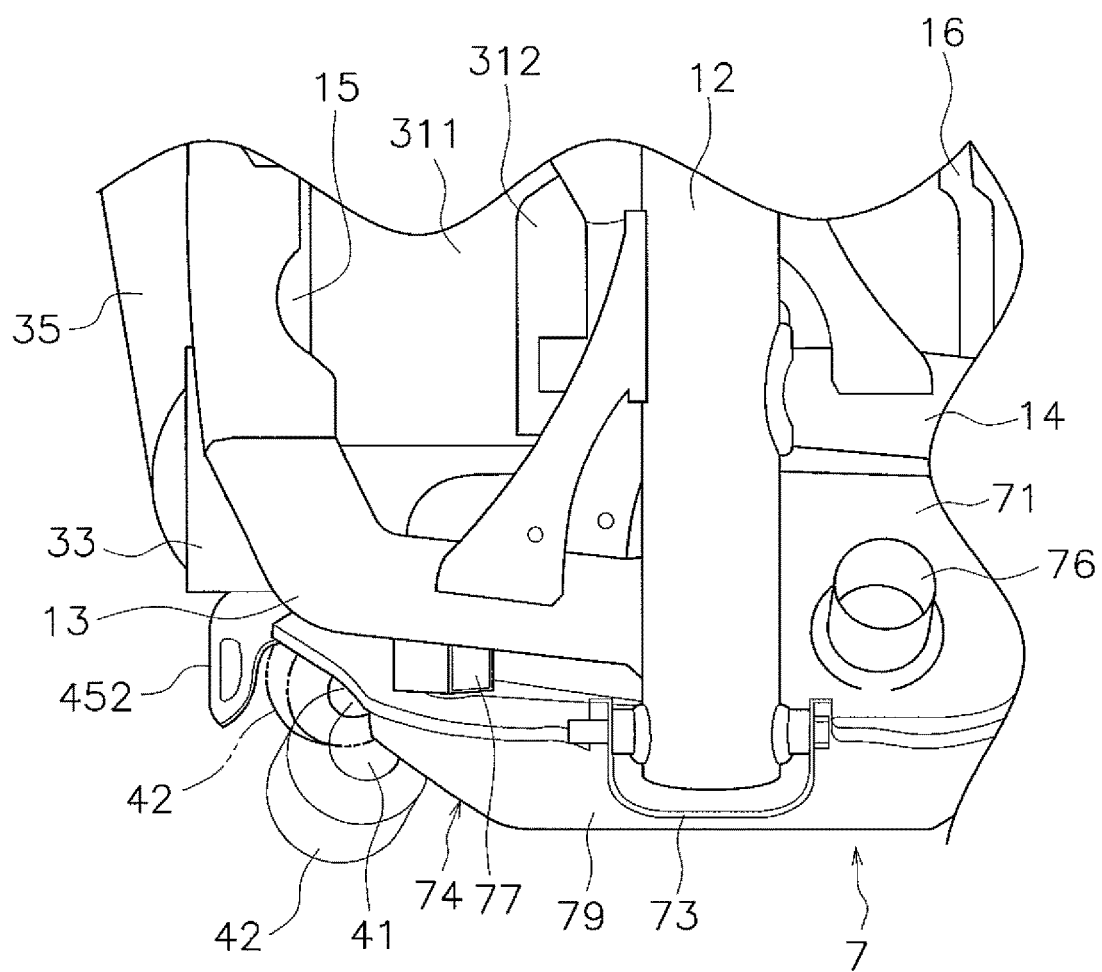
FIG. 11 is a partial front view of the vehicle body frame and the engine unit.

FIG. 9 is a diagram showing a condition in which the engine unit 8 is located in the lowest position within the pivot range thereof. FIG. 10 is a diagram showing a condition in which the engine unit 8 is located in the highest position within the pivot range thereof. FIG. 11 is a partial front view of the vehicle body frame 2 and the engine unit 8. In FIG. 11, solid lines depict the catalyst housing portion 42 in the condition in which the engine unit 8 is located in the lowest position within the pivot range thereof, whereas dashed two-dotted lines depict the catalyst housing portion 42 in the condition in which the engine unit 8 is located in the highest position within the pivot range thereof.

The catalyst housing portion 42 is partially located above the rear end of the bottom portion of the first side lower cover 25 in both of the condition in which the engine unit 8 is located in the lowest position within the pivot range thereof and the condition in which the engine unit 8 is located in the highest position within the pivot range thereof. Therefore, the catalyst housing portion 42 is partially disposed rearward of the space produced between the fuel tank 7 and the first side lower cover 25 in both of the condition in which the engine unit 8 is located in the lowest position within the pivot range thereof and the condition in which the engine unit 8 is located in the highest position within the pivot range thereof. In other words, the catalyst housing portion 42 is partially disposed rearward of the space produced between the fuel tank 7 and the first side lower cover 25 in the entire pivot range thereof.

As shown in FIGS. 9 and 11, the catalyst housing portion 42 is partially located below the bottom surface of the fuel tank 7 in the condition in which the engine unit 8 is located in the lowest position within the pivot range thereof. As shown in FIG. 11, in the vehicle front view, the first slope 74 partially overlaps with the first exhaust pipe 41 in the condition in which the engine unit 8 is located in the lowest position within the pivot range thereof. As shown in FIGS. 10 and 11, the catalyst housing portion 42 is entirely located above the bottom surface of the fuel tank 7 in the condition in which the engine unit 8 is located in the highest position within the pivot range thereof.

In the above described saddle-riding vehicle 1 according to the present exemplary preferred embodiment, the catalyst 36 is disposed as far upstream as possible within the exhaust pipe 34. Thus, the catalyst 36 is quickly activated by speeding up the increase in the temperature of the catalyst 36 after starting of the engine 31. Further, after activated, the catalyst 36 is cooled down by travelling wind flowing between the fuel tank 7 and the first side lower cover 25 during travelling of the vehicle. Therefore, the thermal effect on the foot of the rider is significantly reduced or prevented even when the catalyst 36 is disposed as far upstream as possible within the exhaust pipe 34 and disposed in a position immediately below the front seat portion 5a. Further, the thermal effect on the fuel tank 7 is significantly reduced or prevented even when the catalyst 36 is disposed close to the fuel tank 7 that is disposed under the flat footboard 24.

The catalyst housing portion 42 is preferably at least partially disposed rearward of the space produced between the fuel tank 7 and the first side lower cover 25 in the entire pivot range of the catalyst housing portion 42. Thus, the catalyst 36 is always located in a position frequently receiving travelling wind. It should be noted that the catalyst housing portion 42 is only required to be at least partially disposed rearward of the space produced between the fuel tank 7 and the first side lower cover 25 in at least a portion of the pivot range of the catalyst housing portion 42.

The inner lateral portion of the catalyst housing portion 42 preferably overlaps with the fuel tank 7 in the vehicle front view. Thus, the catalyst housing portion 42 is disposed closer to the vehicle center line C3 than when it is entirely disposed outward of the fuel tank 7 in the vehicle width direction. Accordingly, the thermal effect on the foot of the rider is significantly reduced or prevented when the rider puts his/her feet on the ground while the vehicle stands still. Incidentally, travelling wind is unlikely to reach the inner lateral portion of the catalyst housing portion 42 that overlaps with the fuel tank 7. However, the catalyst housing portion 42 is still sufficiently cooled down. Hence, thermal effect on the fuel tank 7 is significantly reduced or prevented. Especially, the outer lateral portion of the catalyst housing portion 42 is sufficiently cooled down. Hence, the thermal effect on the foot of the rider is significantly reduced or prevented.

The first slope 74 of the fuel tank 7 preferably partially overlaps with the catalyst housing portion 42 in the vehicle front view. Thus, the first slope 74 guides travelling wind to the catalyst housing portion 42. Cooling performance of the catalyst 36 is thus enhanced.

The first slope 74 preferably partially overlaps with the first exhaust pipe 41 in the vehicle front view. Thus, the first slope 74 guides travelling wind to the first exhaust pipe 41. Cooling performance of the catalyst 36 is thus further enhanced.

The catalyst housing portion 42 is preferably located forward of the rotational center C2 of the cooling fan device 33. Thus, the catalyst 36 is cooled down by an air stream produced by the cooling fan device 33. Cooling performance of the catalyst 36 is thus further enhanced.

The cooling fan device 33 and the catalyst housing portion 42 are preferably disposed laterally on the same side with respect to the vehicle center line C3 extending in the vehicle back-and-forth direction. Thus, the catalyst 36 is cooled down by the air stream produced by the cooling fan device 33. Cooling performance of the catalyst 36 is thus further enhanced.

The first side lower cover 25 preferably extends to a position rearward of the fuel tank 7. However, the catalyst housing portion 42 does not overlap with the first side lower cover 25 in the vehicle side view. Thus, the catalyst housing portion 42 is exposed to the outside. Cooling performance of the catalyst 36 is thus further enhanced.

The catalyst housing portion 42 is preferably partially located laterally to the link mechanism 37. Thus, the catalyst housing portion 42 is disposed as far upstream as possible and the lowest ground height is high in comparison with when it is disposed under the link mechanism 37.

The catalyst housing portion 42 is preferably partially located below the bottom surface of the fuel tank 7 while the engine unit 8 is located in the lowest position within the pivot range thereof. Thus, travelling wind is likely to reach the catalyst housing portion 42. Cooling performance of the catalyst 36 is thus further enhanced.

The catalyst housing portion 42 is preferably partially located under the first lower frame 13 in the vehicle front view. Thus, the first lower frame 13 guides travelling wind to the catalyst housing portion 42. Cooling performance of the catalyst 36 is thus further enhanced.

Exemplary preferred embodiments of the present invention have been explained above. However, the present invention is not limited to the above described exemplary preferred embodiments, and a variety of changes can be made without departing from the scope of the present invention.

The saddle-riding vehicle of the preferred embodiments of the present invention is not limited to a motorcycle, and may be travelling vehicle for irregular terrain (e.g., an all-terrain vehicle), a recreational off-highway vehicle (ROV), or a snowmobile.

The engine 31 is not limited to an air-cooled engine, and alternatively, may be a water-cooled engine. Due to this structure, the cooling fan device 33 is not limited to a forced air-cooled fan, and alternatively, may be a water-cooled radiator fan. Further, the cylinder axis Ax1 of the engine 31 may be horizontally disposed. Yet further, the cooling fan device 33 may not be provided.

In the above described exemplary preferred embodiments, the catalyst housing portion 42 is preferably disposed on the right side of the center line C3 of the saddle-riding vehicle 1 extending in the vehicle back-and-forth direction. However, the catalyst housing portion 42 may be disposed on the left side of the center line C3. Due to this structure, similarly to the catalyst housing portion 42, the cooling fan device 33 and the silencer 35 are preferably disposed on the left side of the center line C3. The positions of the first side lower cover 25 and the second side lower cover 26 may be bilaterally reversed from those of the above described exemplary preferred embodiments. Likewise, the positions of the first lower frame 13 and the second lower frame 14 may be bilaterally reversed from those of the above described exemplary preferred embodiments.

Instead of the entirety, only a portion of the engine unit 8 may located under the seat 5. Further, instead of a portion, the entirety of the first exhaust pipe 41 may overlap with the fuel tank 7 in the vehicle front view. Yet further, instead of a portion, the entirety of the catalyst housing portion 42 may be disposed rearward of the space produced between the fuel tank 7 and the vehicle body cover 6.

Instead of a portion, the entirety of the first slope 74 may overlap with the catalyst housing portion 42 in the vehicle front view. Further, instead of a portion, the entirety of the first slope 74 may overlap with the first exhaust pipe 41 in the vehicle front view.

Instead of the entirety, only a portion of the catalyst housing portion 42 may be located forward of the rotational center C2 of the cooling fan device 33. In other words, the front end of the catalyst housing portion 42 may be located forward of the rotational center C2 of the cooling fan device 33, while the rear end of the catalyst housing portion 42 may be located rearward of the rotational center C2 of the cooling fan device 33.

Instead of the entirety, only a portion of the catalyst housing portion 42 may not overlap with the first side lower cover 25 in the vehicle side view. In other words, instead of the entirety, only a portion of the catalyst housing portion 42 may be exposed to the outside in the vehicle side view. Further, instead of a portion, the entirety of the catalyst housing portion 42 may be located laterally to the link mechanism 37.

Instead of a portion, the entirety of the catalyst housing portion 42 may be disposed rearward of the space produced between the fuel tank 7 and the vehicle body cover 6 in the entire pivot range of the catalyst housing portion 42. Further, instead of a portion, the entirety of the catalyst housing portion 42 may be located below the bottom surface of the fuel tank 7 in the condition in which the engine unit 8 is located in the lowest position within the pivot range thereof. Yet further, instead of the entirety, only a portion of the catalyst housing portion 42 may be located under the lower frames 13 and 14 in the vehicle front view. Moreover, the catalyst housing portion 42 may be at least partially disposed rearward of the space produced between the fuel tank 7 and the vehicle body cover 6 only in a portion of the pivot range of the catalyst housing portion 42.

Figure 12A:
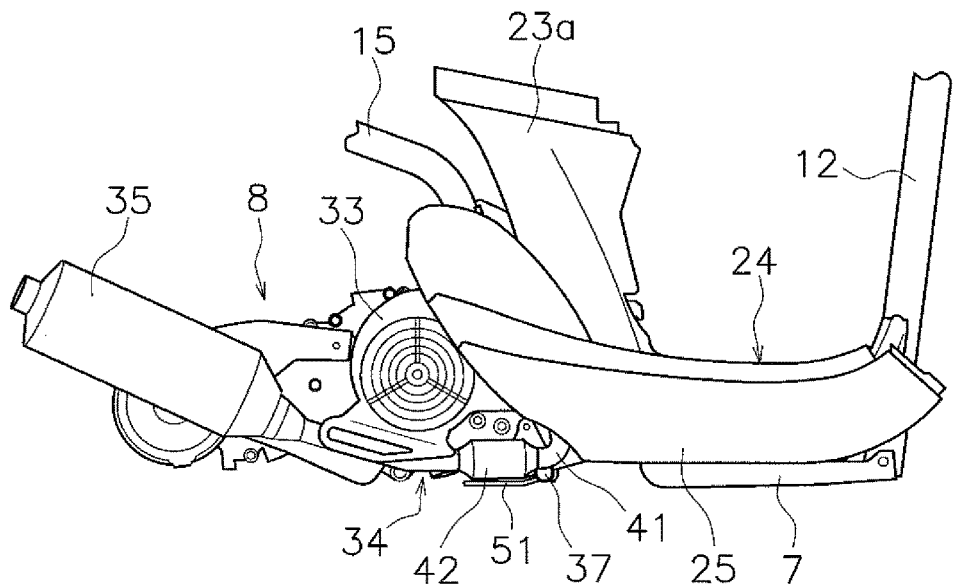
FIGS. 12A and 12B are partial views of a saddle-riding vehicle according to a first modification of a preferred embodiment of the present invention.
Figure 12B:
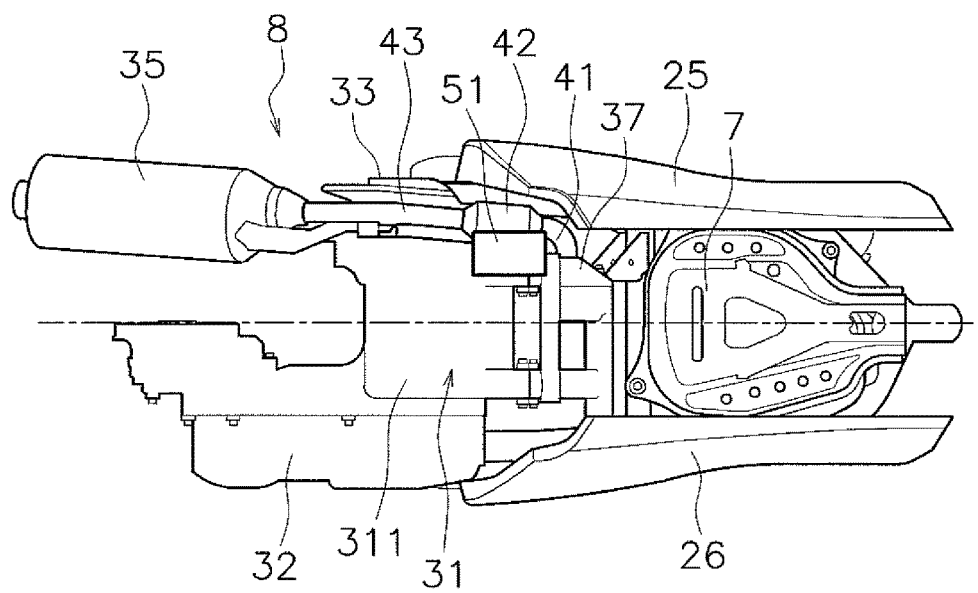

The saddle-riding vehicle 1 preferably includes a protection member. For example, FIG. 12A is a partial side view of a saddle-riding vehicle according to a first modification of a preferred embodiment of the present invention. FIG. 12B is a partial bottom view of the saddle-riding vehicle according to the first modification. As shown in FIGS. 12A and 12B, a protection member 51 is disposed under the catalyst housing portion 42. The protection member 51 is attached to the link mechanism 37. Due to this structure, the protection member 51 protects the catalyst housing portion 42 from obstacles such as stones.

Figure 13A:
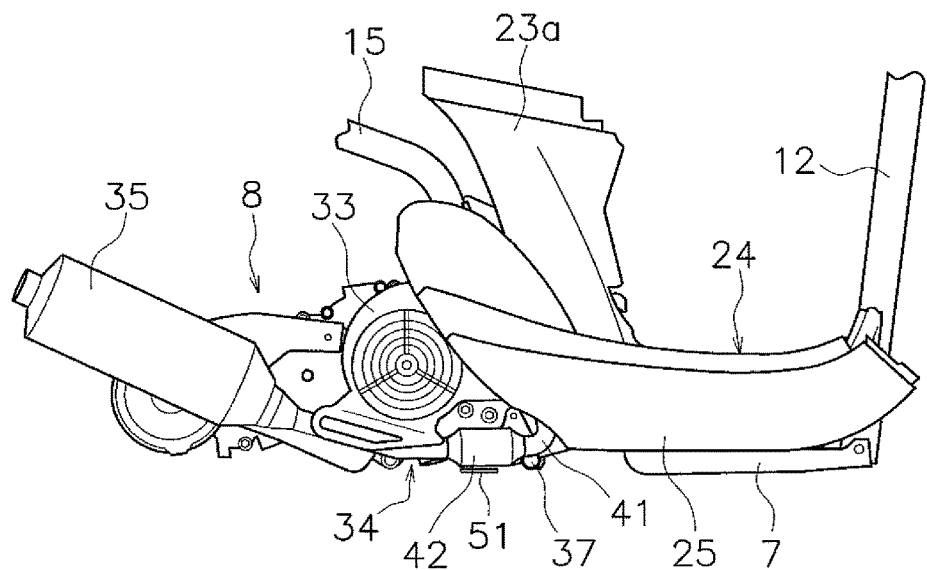
FIGS. 13A and 13B are partial views of a saddle-riding vehicle according to a second modification of a preferred embodiment of the present invention.
Figure 13B:
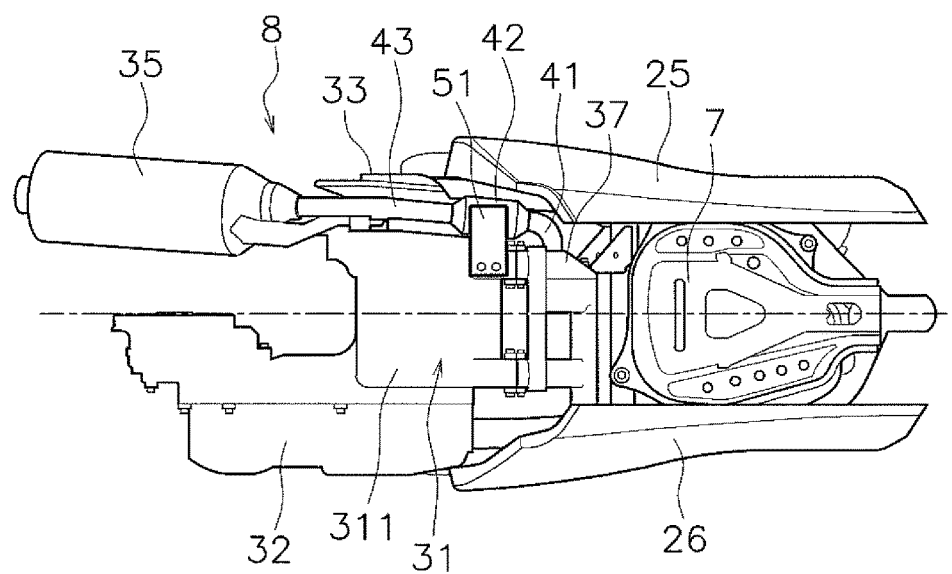

The protection member 51 may be attached to another member other than the link mechanism 37. For example, FIG. 13A is a partial side view of a saddle-riding vehicle according to a second modification of a preferred embodiment of the present invention. FIG. 13B is a partial bottom view of the saddle-riding vehicle according to the second modification. As shown in FIGS. 13A and 13B, the protection member 51 is attached to the engine 31. In detail, the protection member 51 is attached to the crankcase 311.

Figure 14:
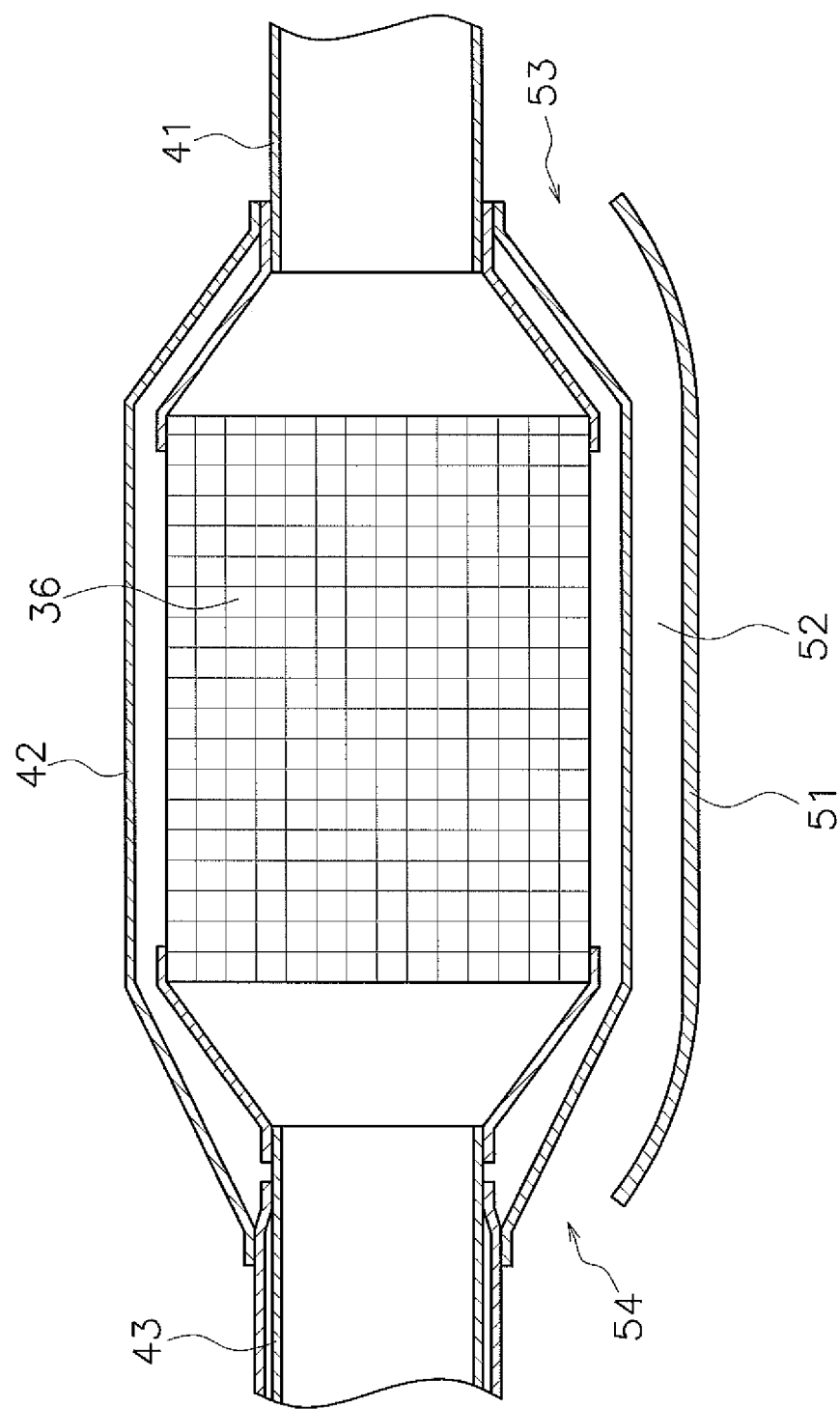
FIG. 14 is a cross-sectional view of a protection member and a catalyst housing portion according to yet another modification of the first or second modification of a preferred embodiment of the present invention.

A wind guide path is preferably produced between the protection member 51 and the catalyst housing portion 42. For example, as shown in FIG. 14, the protection member 51 and the catalyst housing portion 42 produce therebetween a wind guide path 52, a first opening 53, and a second opening 54. The first opening 53 is located forward of the wind guide path 52 and communicates with the external space. The second opening 54 is located rearward of the wind guide path 52 and communicates with the external space. This structure causes travelling wind to flow into the first opening 53, flow through the wind guide path 52, and flow out of the second opening 54. The catalyst 36 is thus cooled down. Thus, cooling performance of the catalyst 36 is further enhanced.

Figure 15A:
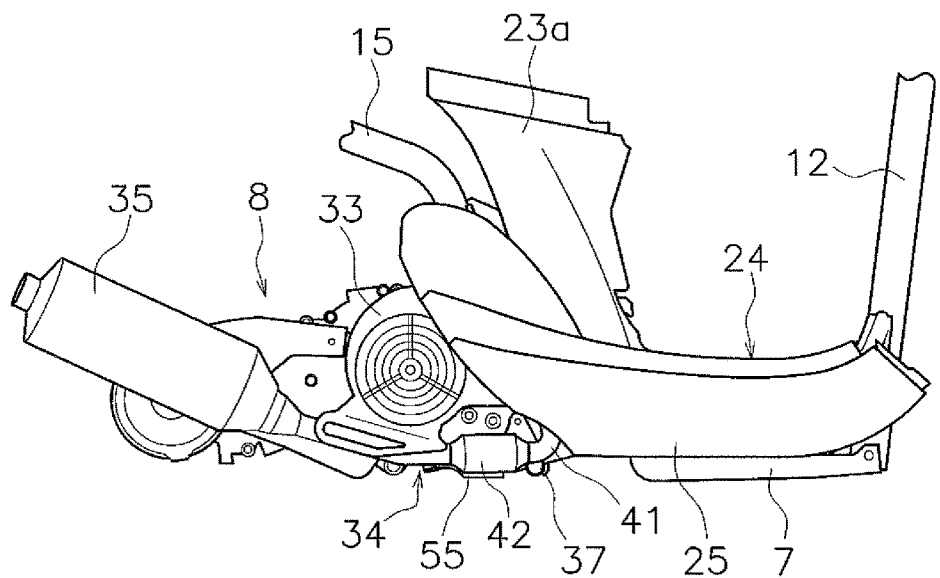
FIGS. 15A and 15B are partial views of a saddle-riding vehicle according to a fourth modification of a preferred embodiment of the present invention.
Figure 15B:
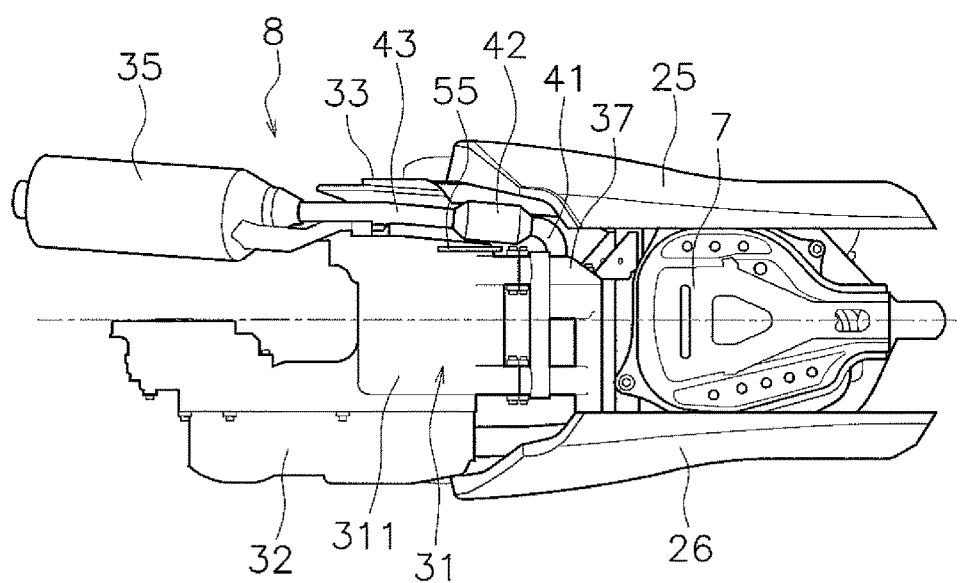

The engine 31 preferably includes a rib to protect the catalyst housing portion 42. For example, FIG. 15A is a partial side view of a saddle-riding vehicle according to a fourth modification of a preferred embodiment of the present invention. FIG. 15B is a partial bottom view of the saddle-riding vehicle according to the fourth modification. As shown in FIGS. 15A and 15B, a rib 55 extends from the engine 31 to a position below the catalyst housing portion 42. Specifically, the rib 55 is disposed on the crankcase 311. The rib 55 extends laterally to and along the catalyst housing portion 42 in the back-and-forth direction. Due to this structure, the rib 55 protects the catalyst housing portion 42 from stones and so forth from under the catalyst housing portion 42.

Figure 16A:
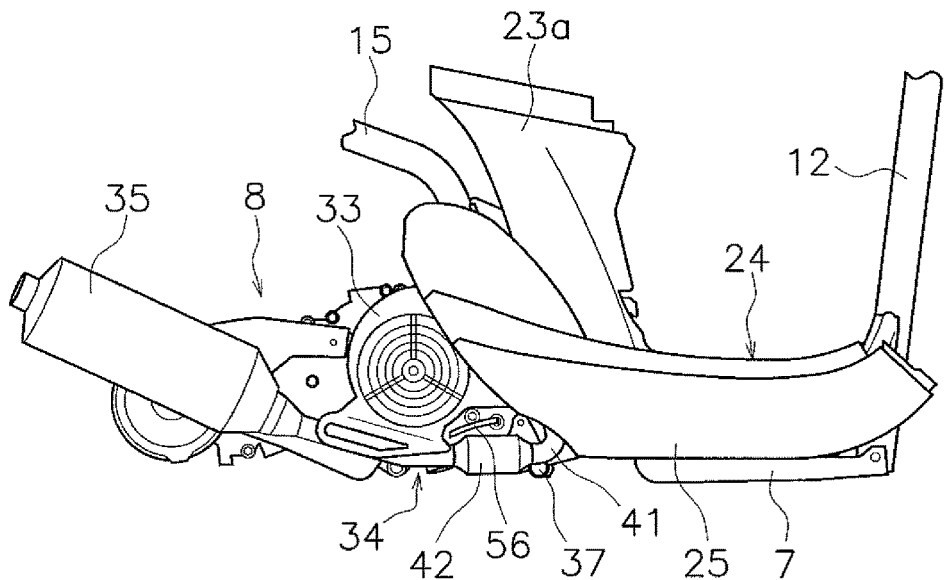
FIGS. 16A and 16B are partial views of a saddle-riding vehicle according to a fifth modification of a preferred embodiment of the present invention.
Figure 16B:
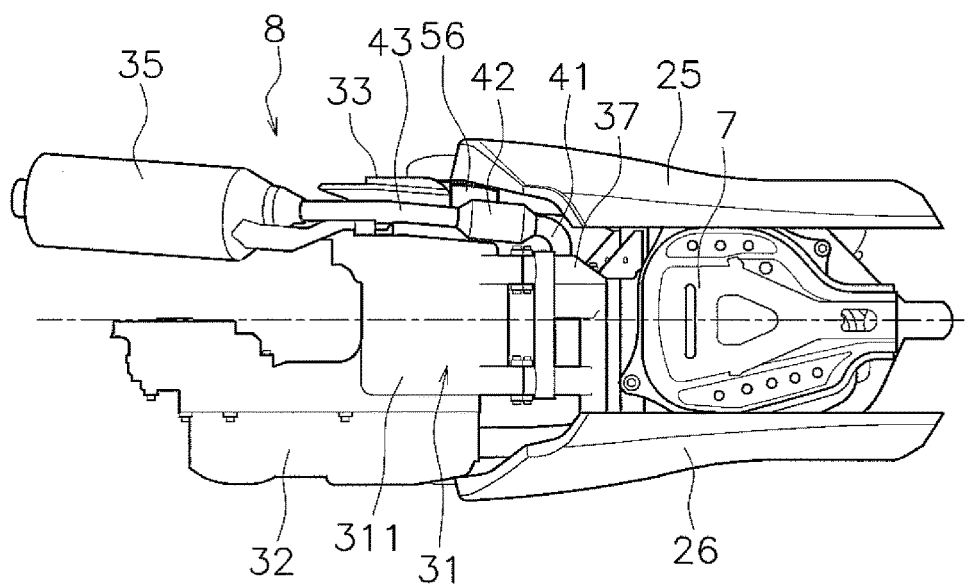

The engine unit 8 preferably includes an engine heat insulation member. For example, FIG. 16A is a partial side view of a saddle-riding vehicle according to a fifth modification of a preferred embodiment of the present invention. FIG. 16B is a partial bottom view of the saddle-riding vehicle according to the fifth modification. As shown in FIGS. 16A and 16B, an engine heat insulation member 56 is disposed between the cooling fan device 33 and the catalyst housing portion 42. The engine heat insulation member 56 is disposed over the catalyst housing portion 42. The engine heat insulation member 56 is connected to the fan cover 45 of the cooling fan device 33. When it is intended to enhance the cooling performance of the cooling fan device 33, the engine heat insulation member 56 thus prevents heat of the catalyst 36 from being transferred to the cooling wind produced by the cooling fan device 33.

Figure 17:
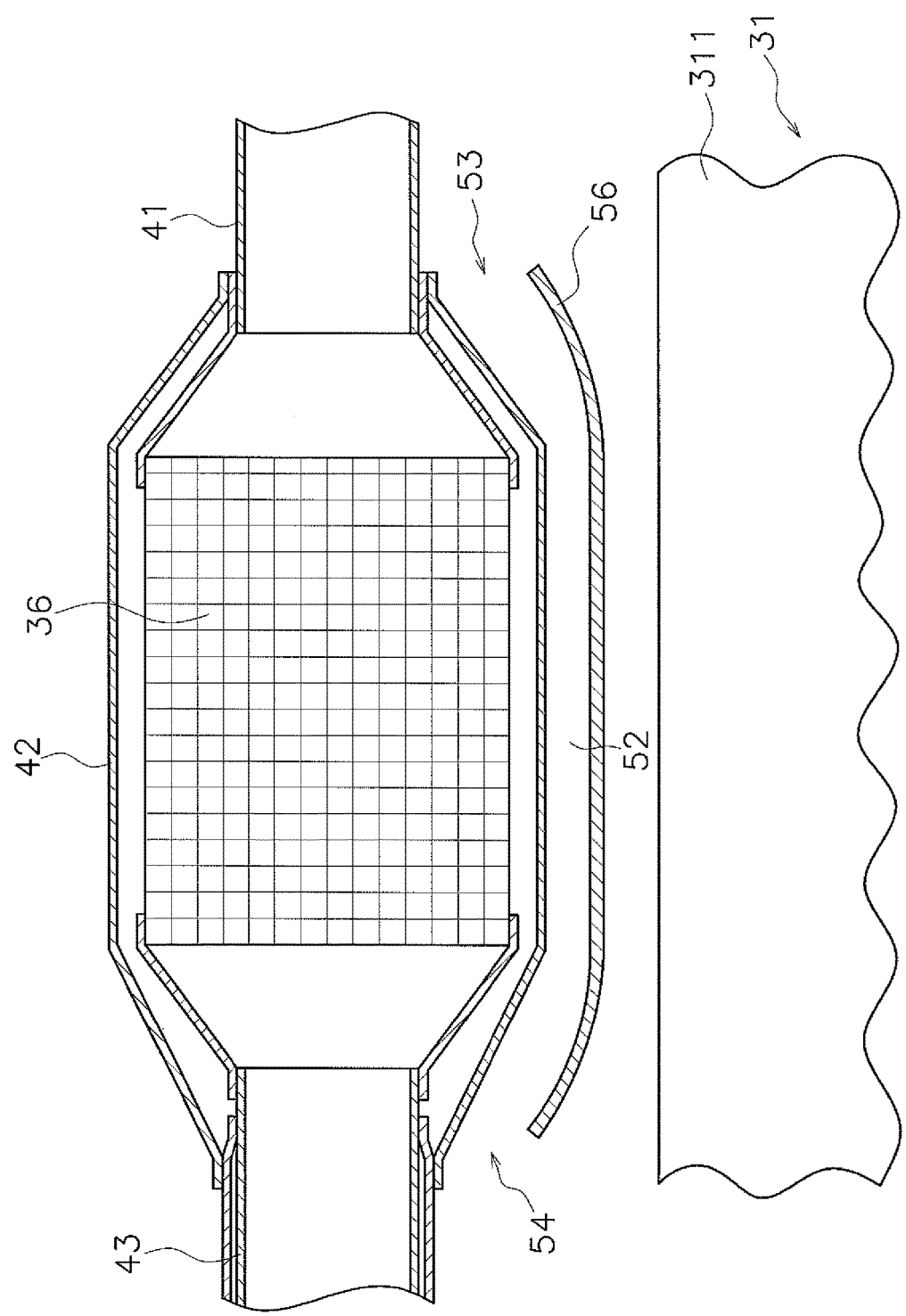
FIG. 17 is a partial bottom view of a saddle-riding vehicle according to a sixth modification of a preferred embodiment of the present invention.

FIG. 17 is a partial bottom view of a saddle-riding vehicle according to a sixth modification of a preferred embodiment of the present invention. As shown in FIG. 17, the engine heat insulation member 56 is preferably disposed between the engine 31 and the catalyst housing portion 42. The engine heat insulation member 56 is disposed laterally of the catalyst housing portion 42. The engine heat insulation member 56 is disposed between the crankcase 311 and the catalyst housing portion 42 in the vehicle width direction. The engine heat insulation member 56 and the catalyst housing portion 42 define therebetween the wind guide path 52, the first opening 53, and the second opening 54. The first opening 53 is located forward of the wind guide path 52 and communicates with the external space. The second opening 54 is located rearward of the wind guide path 52 and communicates with the external space.

Due to this structure, the engine heat insulation member 56 prevents heat from the catalyst 36 from being transferred to the engine 31. Further, this structure causes travelling wind to flow into the first opening 53, flow through the wind guide path 52, and flow out of the second opening 54. The catalyst 36 is thus cooled down. Thus, cooling performance of the catalyst 36 is further enhanced.

Figure 18A:
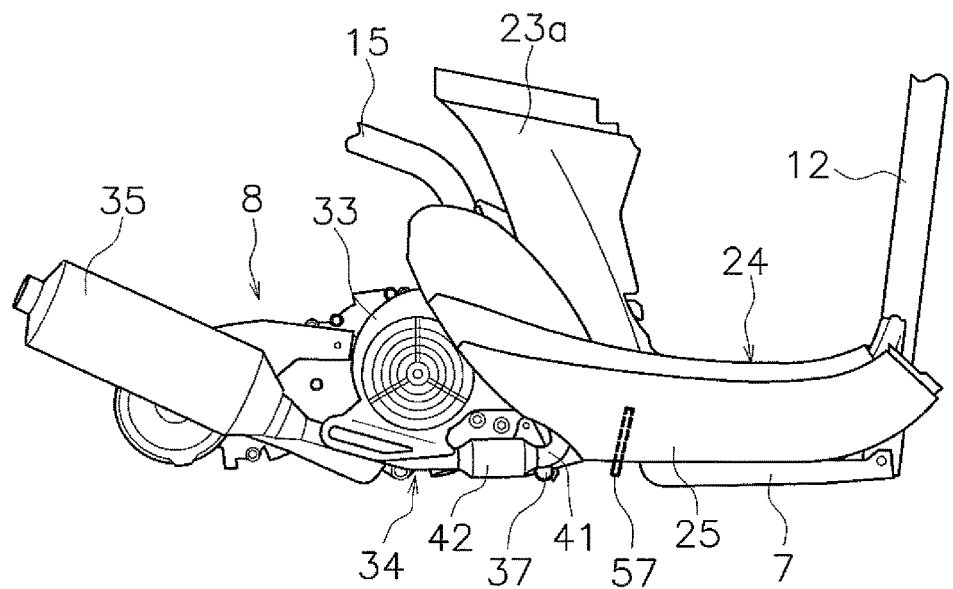
FIGS. 18A and 18B are partial views of a saddle-riding vehicle according to a seventh modification of a preferred embodiment of the present invention.
Figure 18B:
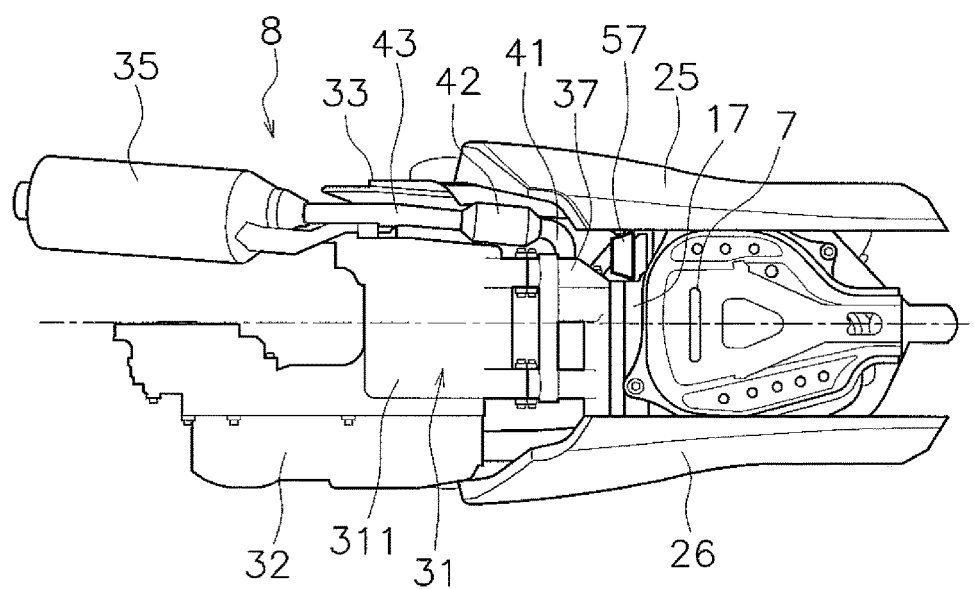

The saddle-riding vehicle according to a preferred embodiment of the present invention preferably includes a fuel tank heat insulation member. The fuel tank heat insulation member is disposed between the fuel tank 7 and the catalyst housing portion 42. For example, FIG. 18A is a partial side view of a saddle-riding vehicle according to a seventh modification of a preferred embodiment of the present invention. FIG. 18B is a partial bottom view of the saddle-riding vehicle according to the seventh modification. As shown in FIGS. 18A and 18B, a fuel tank heat insulation member 57 is attached to the first coupling frame 17. The fuel tank heat insulation member 57 is disposed rearward of the fuel tank 7 and forward of the catalyst housing portion 42. This structure inhibits heat from the catalyst 36 from being transferred to the fuel tank 7.

Figure 19A:
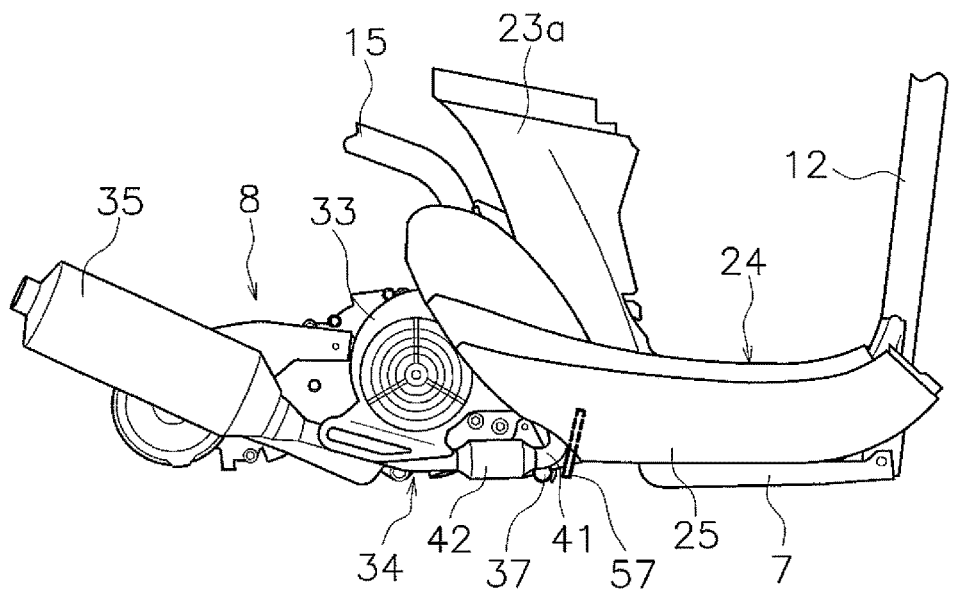
FIGS. 19A and 19B are partial views of a saddle-riding vehicle according to an eighth modification of a preferred embodiment of the present invention.
Figure 19B:
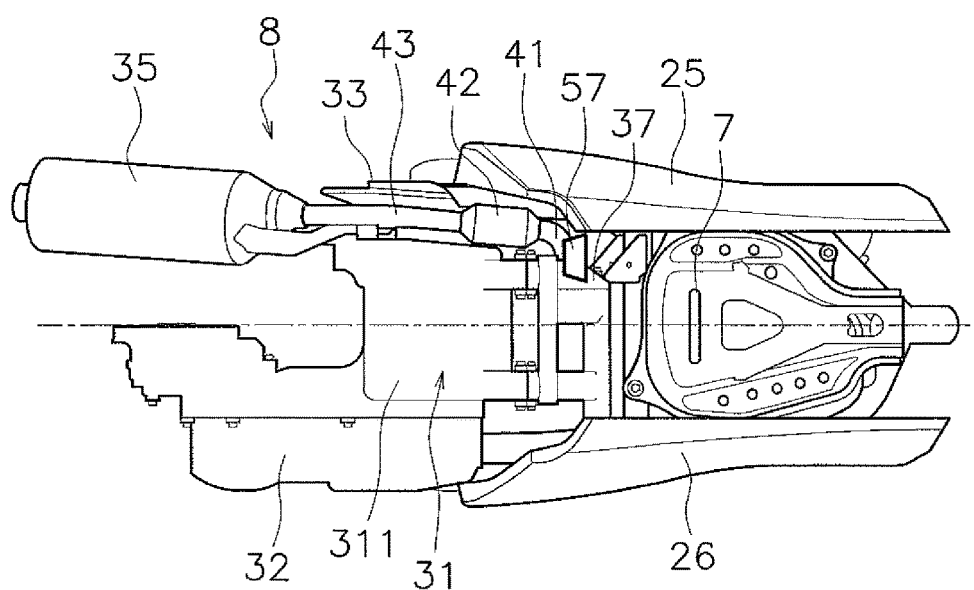

The fuel tank heat insulation member 57 may be attached to another portion other than the first coupling frame 17. For example, FIG. 19A is a partial side view of a saddle-riding vehicle according to an eighth modification. FIG. 19B is a partial bottom view of the saddle-riding vehicle according to the eighth modification. As shown in FIGS. 19A and 19B, the fuel tank heat insulation member 57 is attached to the link mechanism 37.

Figure 20A:
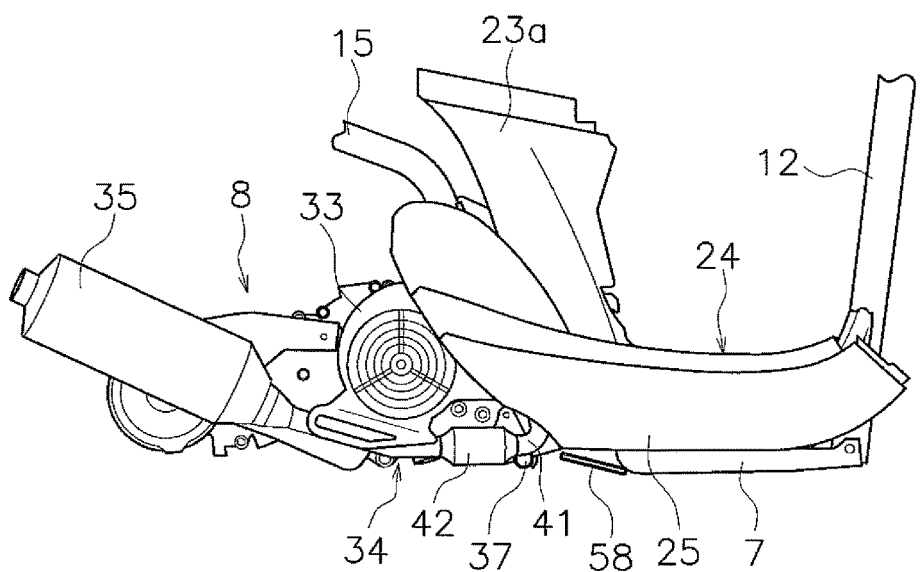
FIGS. 20A and 20B are partial views of a saddle-riding vehicle according to a ninth modification of a preferred embodiment of the present invention.
Figure 20B:
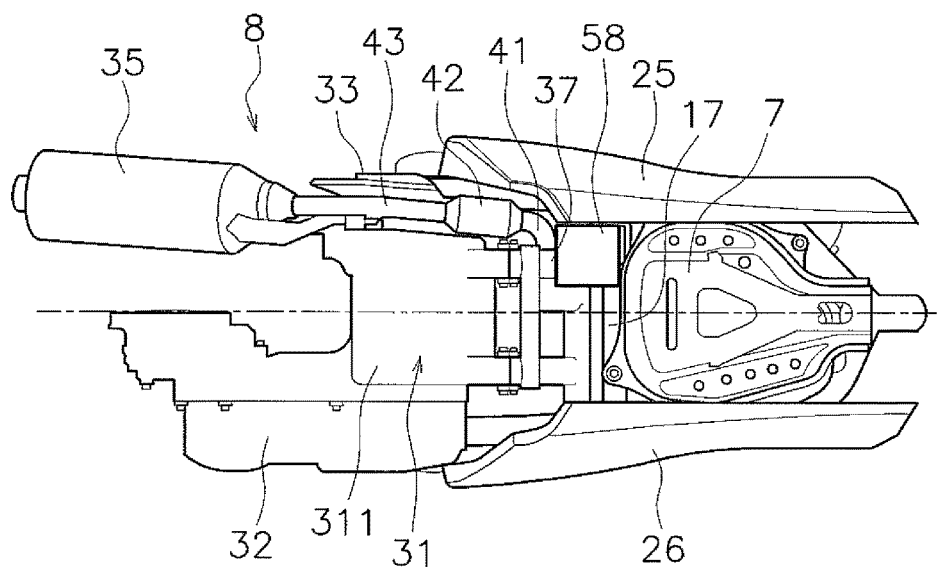

The saddle-riding vehicle according to a preferred embodiment of the present invention preferably includes a wind guide member. For example, FIG. 20A is a partial side view of a saddle-riding vehicle according to a ninth modification. FIG. 20B is a partial bottom view of the saddle-riding vehicle according to the ninth modification. As shown in FIGS. 20A and 20B, a wind guide member 58 is disposed between the fuel tank 7 and the catalyst housing portion 42, and guides travelling wind flowing under the fuel tank 7 to flow toward the catalyst housing portion 42. The wind guide member 58 is preferably plate member, for example, and is disposed along a direction from the bottom portion of the fuel tank 7 toward the catalyst housing portion 42. The wind guide member 58 is attached to the first coupling frame 17. Due to this structure, the catalyst 36 is cooled down by guiding travelling wind flowing under the fuel tank 7 to flow toward the catalyst housing portion 42 with the wind guide member 58. Thus, cooling performance of the catalyst 36 is further enhanced. It should be noted that the wind guide member 58 may be attached to another member other than the first coupling frame 17. For example, the wind guide member 58 may be attached to the link mechanism 37.

Figure 21:
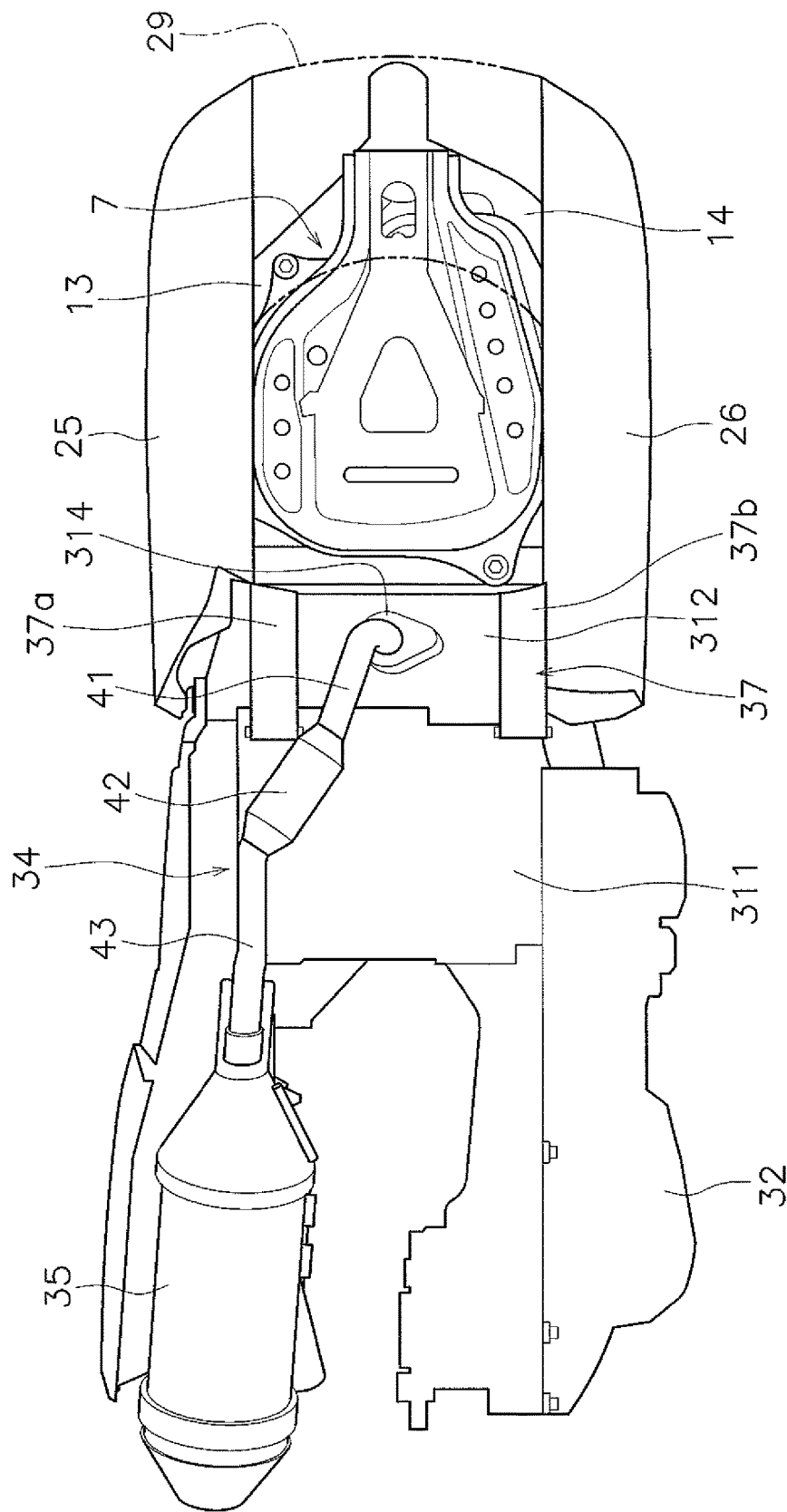
FIG. 21 is a partial view of a saddle-riding vehicle according to a tenth modification of a preferred embodiment of the present invention.

The catalyst housing portion 42 may be at least partially located rearward of the link mechanism 37. For example, FIG. 21 is a partial bottom view of a saddle-riding vehicle according to a tenth modification of a preferred embodiment of the present invention. As shown in FIG. 21, the catalyst housing portion 42 is preferably partially located rearward of the link mechanism 37. The link mechanism 37 includes a first link portion 37a and a second link portion 37b. The first link portion 37a and the second link portion 37b are separately disposed to the right and left. The exhaust port 314 is located between the first link portion 37a and the second link portion 37b in the vehicle bottom view. The first exhaust pipe 41 runs between the first link portion 37a and the second link portion 37b and then bends rearward. The catalyst housing portion 42 extends rearward. The catalyst housing portion 42 is located under the crankcase 311. Similarly to the above described exemplary preferred embodiments, due to this structure, the catalyst housing portion 42 is disposed as far upstream as possible and the lowest ground height is reliably high. It should be noted that instead of a portion, the entirety of the catalyst housing portion 42 may be located rearward of the link mechanism 37.

The vehicle body cover 6 is not limited to have a specific shape as long as the catalyst housing portion 42 is at least partially located between the fuel tank 7 and the vehicle body cover 6 in the vehicle width direction. In other words, the vehicle body cover 6 may have any shape as long as the vehicle body cover 6 guides wind flowing between the fuel tank 7 and the vehicle body cover 6 to flow toward the catalyst housing portion 42.

Figure 22:
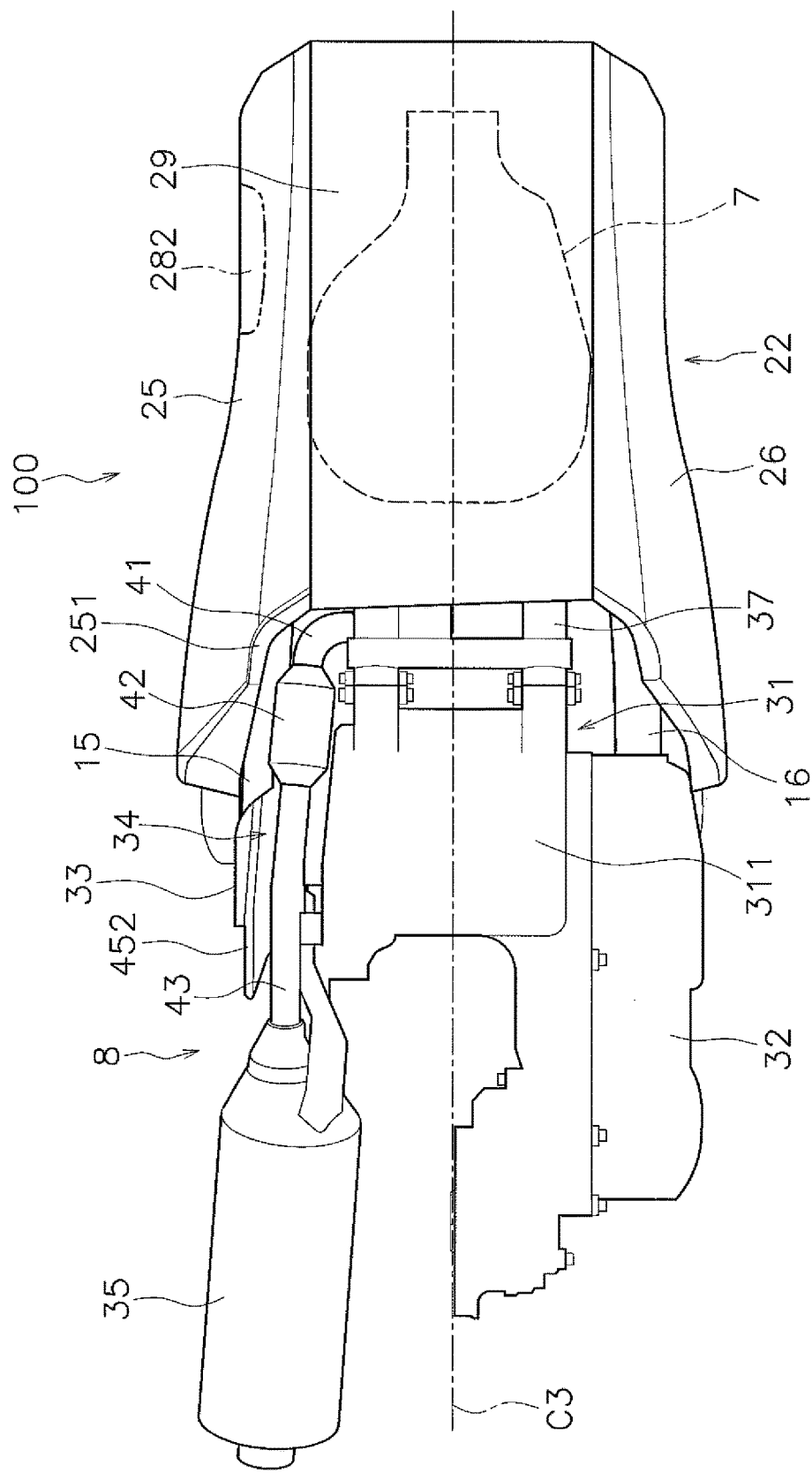
FIG. 22 is a partial bottom view of a saddle-riding vehicle according to an eleventh modification of a preferred embodiment of the present invention.
Figure 23:
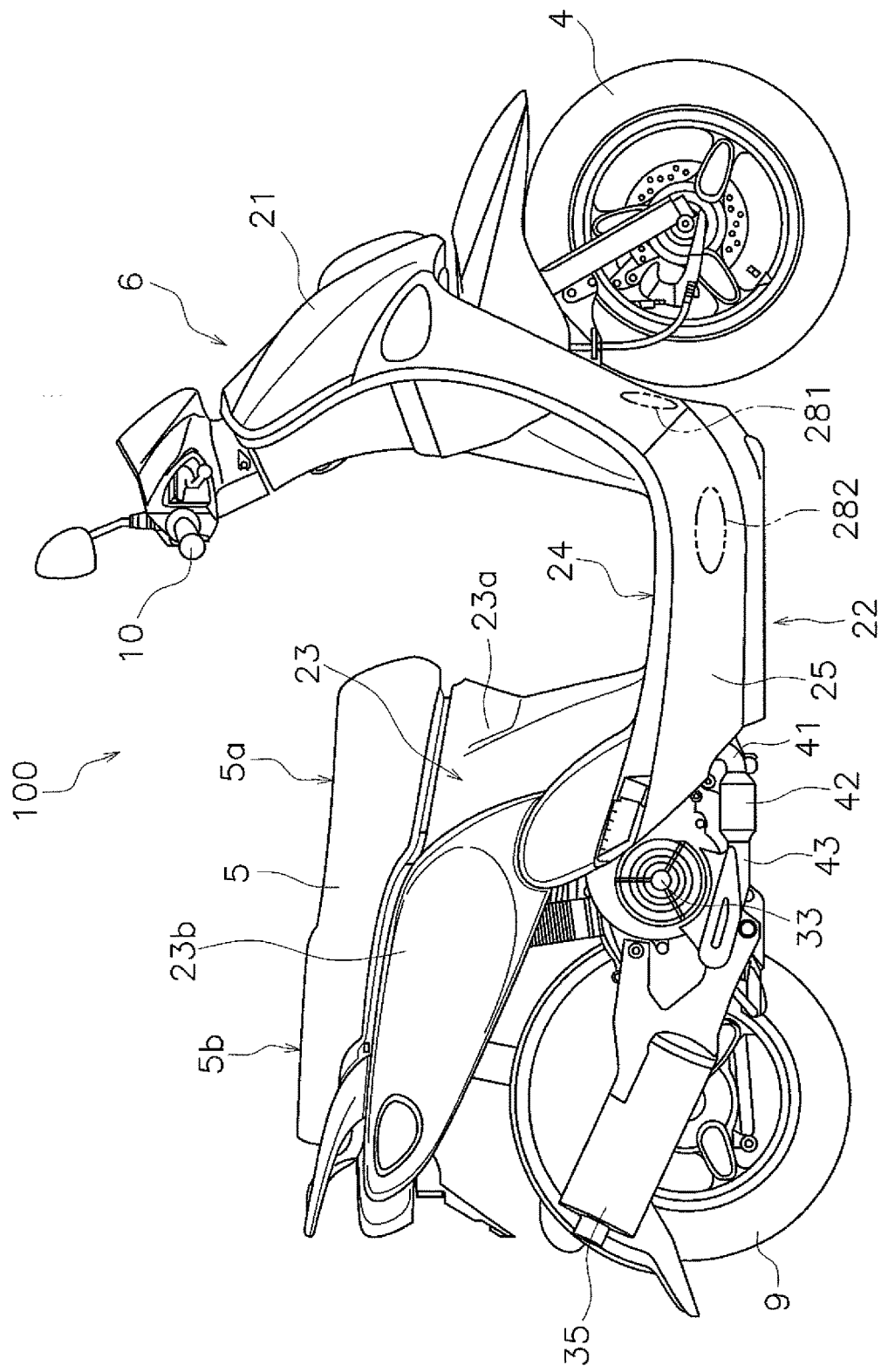
FIG. 23 is a side view of the saddle-riding vehicle according to the eleventh modification of a preferred embodiment of the present invention.

In the above described exemplary preferred embodiments, the lower cover 22 includes the first and second openings 61 and 62 in the bottom surface thereof, whereas the tank cover 79 includes the third to fifth openings 63 to 65 therein. However, the openings may be provided in other portions. For example, FIG. 22 is a partial bottom view of a saddle-riding vehicle 100 according to an eleventh modification of a preferred embodiment of the present invention. As shown in FIG. 22, the lower cover 22 includes a bottom surface cover 29. The bottom surface cover 29 covers the fuel tank 7 from below. FIG. 23 is a side view of the saddle-riding vehicle 100 according to the eleventh modification. As shown in FIG. 23, an opening 281 may be in a portion of the front cover 21, i.e., a portion located rearward of the front wheel 4. Alternatively, an opening 282 may be provided in the first side lower cover 25. Yet alternatively, both of the openings 281 and 282 may be provided. Yet further alternatively, each of the opening or openings may be a clearance produced between overlapping portions of discrete members. It should be noted that each of the opening or openings is only required to be at least partially located forward of the rear end of the lateral portion of the fuel tank 7.

In the above described exemplary preferred embodiments, the fuel tank 7 includes the tank body 71 and the tank cover 79. However, the fuel tank 7 may not include the tank cover 79.

The terms and expressions, as used herein, are provided for the purpose of explanation, not of limitation to interpretation. It is to be recognized that there is no intention to exclude any equivalents of the features herein illustrated and described, and various modifications are possible within the scope claimed in the present invention. The present invention can be embodied in many different forms. The present disclosure should be considered to provide the principle preferred embodiments of the present invention. Those preferred embodiments are herein described with the understanding of not intending to limit the present invention to the preferred embodiments herein described and/or illustrated. Thus, the present invention is not to be limited to those preferred embodiments herein described. The present invention even encompasses all the preferred embodiments including equivalent elements, modifications, deletions, combinations, improvements and/or changes, which could be recognized by a person skilled in the art based on the present disclosure. A limitation in a claim should be broadly interpreted based on terms used in the claim, and should not be limited to any of the preferred embodiments described in the present specification or during prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A saddle-riding vehicle comprising:
a vehicle body frame;
a seat supported by the vehicle body frame;
a flat footboard disposed forward of and below the seat;
a fuel tank disposed under the flat footboard;
a vehicle body cover disposed laterally of the fuel tank;
an opening configured to introduce travelling wind to a space located directly between the fuel tank and a portion of the vehicle body cover in a lateral direction of the vehicle; and
an engine unit disposed rearward of the flat footboard and the fuel tank and configured to be pivotably supported by the vehicle body frame; wherein the engine unit is at least partially located under the seat;
the engine unit includes:
an engine including an exhaust port;
an exhaust pipe connected to the exhaust port;
a silencer connected to the exhaust pipe; and
a catalyst disposed within the exhaust pipe;
the exhaust pipe includes:
a first exhaust pipe located upstream of the catalyst and connected to the exhaust port;
a catalyst housing portion configured to accommodate the catalyst, the catalyst housing portion being connected to the first exhaust pipe and extending rearward from the first exhaust pipe; and
a second exhaust pipe located downstream of the catalyst, being connected to the catalyst housing portion, extending rearward from the catalyst housing portion, and being connected to the silencer;
the first exhaust pipe at least partially overlaps with the fuel tank in a vehicle front view; and
the catalyst housing portion is at least partially disposed rearward of the space between the fuel tank and the vehicle body cover.

2. The saddle-riding vehicle according to claim 1, wherein a cylinder axis of the engine extends in a direction intersecting with a vertical direction; a pivot center of the engine unit and the catalyst housing portion are located below the cylinder axis; and the catalyst housing portion is at least partially disposed rearward of the space between the fuel tank and the vehicle body to cover an entire pivot range of the catalyst housing portion.

3. The saddle-riding vehicle according to claim 1, wherein the seat includes a front seat portion on which a rider is to be seated; the catalyst housing portion overlaps with the front seat portion in a vehicle back-and-forth direction; the catalyst housing portion is at least partially exposed in a vehicle side view; and the catalyst housing portion overlaps at an inner lateral portion thereof with the fuel tank in the vehicle front view.

4. The saddle-riding vehicle according to claim 1, wherein the fuel tank includes a slope tilting upward and laterally outward in the vehicle front view; and the slope at least partially overlaps with the catalyst housing portion in the vehicle front view.

5. The saddle-riding vehicle according to claim 4, wherein the slope at least partially overlaps with the first exhaust pipe in the vehicle front view.

6. The saddle-riding vehicle according to claim 1, wherein the engine unit further includes a cooling fan; and the catalyst housing portion is at least partially located forward of a rotational center of the cooling fan.

7. The saddle-riding vehicle according to claim 1, wherein the engine unit further includes a cooling fan; and the cooling fan and the catalyst housing portion are disposed laterally on a same side with respect to a vehicle center line extending in a vehicle back-and-forth direction.

8. The saddle-riding vehicle according to claim 1, wherein the vehicle body cover extends to a location rearward of the fuel tank; and the catalyst housing portion does not at least partially overlap with the vehicle body cover in a vehicle side view.

9. The saddle-riding vehicle according to claim 1, further comprising a link mechanism connecting the engine unit and the vehicle body frame; wherein the catalyst housing portion is at least partially located laterally of the link mechanism.

10. The saddle-riding vehicle according to claim 1, further comprising a link mechanism connecting the engine unit and the vehicle body frame; wherein the catalyst housing portion is at least partially located rearward of the link mechanism in a vehicle bottom view.

11. The saddle-riding vehicle according to claim 1, further comprising a protection member disposed under the catalyst housing portion.

12. The saddle-riding vehicle according to claim 11, further comprising a link mechanism connecting the engine unit and the vehicle body frame, wherein the protection member is attached to the link mechanism.

13. The saddle-riding vehicle according to claim 11, wherein the protection member is attached to the engine.

14. The saddle-riding vehicle according to claim 11, wherein
the protection member and the catalyst housing portion define therebetween a wind guide path, a first opening, and a second opening;
the first opening is located forward of the wind guide path and communicates with an external space; and
the second opening is located rearward of the wind guide path and communicates with the external space.

15. The saddle-riding vehicle according to claim 1, wherein the engine includes a rib extending to a position below the catalyst housing portion.

16. The saddle-riding vehicle according to claim 1, wherein the engine unit further includes:
a cooling fan disposed laterally of the engine; and
an engine heat insulation member disposed between the cooling fan and the catalyst housing portion.

17. The saddle-riding vehicle according to claim 1, wherein the engine unit further includes an engine heat insulation member disposed between the engine and the catalyst housing portion.

18. The saddle-riding vehicle according to claim 16, wherein
the engine heat insulation member and the catalyst housing portion define therebetween a wind guide path, a first opening, and a second opening;
the first opening is located forward of the wind guide path and communicates with an external space; and
the second opening is located rearward of the wind guide path and communicates with the external space.

19. The saddle-riding vehicle according to claim 1, further comprising a fuel tank heat insulation member disposed between the fuel tank and the catalyst housing portion.

20. The saddle-riding vehicle according to claim 1, further comprising a wind guide member configured to guide travelling wind flowing under the fuel tank to flow toward the catalyst housing portion, wherein the wind guide member is disposed between the fuel tank and the catalyst housing portion.

21. The saddle-riding vehicle according to claim 1, wherein the catalyst housing portion is at least partially located below a bottom surface of the fuel tank when the engine unit is located in a lowest position within a pivot range thereof.

22. The saddle-riding vehicle according to claim 1, wherein the vehicle body frame includes a lower frame extending under the flat footboard and rearward therefrom; and the catalyst housing portion is at least partially located under the lower frame in the vehicle front view.

* * * * *